United States Patent
Matsumoto et al.

(10) Patent No.: US 8,394,516 B2
(45) Date of Patent: Mar. 12, 2013

(54) GLASS SUBSTRATE FOR MAGNETIC RECORDING MEDIUM AND MAGNETIC RECORDING MEDIUM

(75) Inventors: Naomi Matsumoto, Shinjuku-ku (JP); Kinobu Osakabe, Shinjuku-ku (JP); Yoichi Hachitani, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/941,832

(22) Filed: Nov. 8, 2010

(65) Prior Publication Data
US 2012/0107647 A1 May 3, 2012

(30) Foreign Application Priority Data
Oct. 29, 2010 (JP) ................ 2010-243069

(51) Int. Cl.
- G11B 5/73 (2006.01)
- C03C 3/087 (2006.01)
- C03C 3/097 (2006.01)

(52) U.S. Cl. ............ 428/846.9; 501/69; 501/70
(58) Field of Classification Search ........ 428/846.9, 428/848, 425.6, 426; 360/314, 315; 427/372.2; 501/5, 64, 66, 69, 70, 27, 63
See application file for complete search history.

(56) References Cited

U.S. PATENT DOCUMENTS

| | | | |
|---|---|---|---|
| 2003/0109370 A1* | 6/2003 | Ikenishi et al. | 501/66 |
| 2005/0003136 A1 | 1/2005 | Kurachi et al. | |
| 2005/0164036 A1* | 7/2005 | Zou | 501/5 |
| 2005/0215414 A1* | 9/2005 | Kawai | 501/69 |
| 2005/0244656 A1 | 11/2005 | Ikenishi et al. | |
| 2006/0216552 A1* | 9/2006 | Ikenishi et al. | 428/846.9 |
| 2009/0239102 A1* | 9/2009 | Nagashima et al. | 428/846.9 |
| 2010/0273635 A1* | 10/2010 | Tsuzuki et al. | 501/70 |

FOREIGN PATENT DOCUMENTS

| | | |
|---|---|---|
| JP | 2005314159 A | 11/2001 |
| JP | 200515328 A | 1/2005 |
| WO | 2008062847 A1 | 5/2008 |

OTHER PUBLICATIONS

Hoya, JP 2005-314159, Translation, Jan. 2005.*
International Search Report and Written Opinion corresponding to PCT Application No. PCT/JP2011/074986, dated Feb. 7, 2012.

* cited by examiner

*Primary Examiner* — Kevin M. Bernatz
*Assistant Examiner* — Louis Falasco
(74) *Attorney, Agent, or Firm* — Sughrue Mion, PLLC

(57) ABSTRACT

The present invention relates to recording glass substrates molar percentages: 56-75 $SiO_2$, 1-11 $Al_2O_3$, more than 0-4 $Li_2O$, 1-15 $Na_2O$. more than 0 less than 3 $K_2O$, no BaO. total $Li_2O$, $Na_2O$ and $K_2O$ 6-15, ($Li_2O$ $Na_2O$) less than 0.50, $\{K_2O/(Li_2O, Na_2O \text{ and } K_2O)\}$ equal or less than 0.13, total MgO, CaO and SrO 10-30, MgO and CaO 10-30, $\{(MgO+CaO)/(MgO+CaO+SrO)\}$ equal or more than 0.86, alkali oxides to alkaline earth oxides equal to or more than 0.50. total $ZrO_2$, $TiO_2$, $Y_2O_3$, $La_2O_3$, $Gd_2O_3$, $Nb_2O_5$, and $Ta_2O_5$ more than 0 equal to or less than 10, molar ratio $\{(ZrO_2, TiO_2, Y_2O_3, La_2O_3, Gd_2O_3, Nb_2O_5, \text{ and } Ta_2O_5)/Al_2O_2$ equal or more than 0.40, Tg equal to or higher than 600° C., average coefficient linear expansion equal or higher than $70 \times 10^{-7}$/°C. at 100-300° C. and Young's modulus equal to or higher than 80 GPa.

14 Claims, 1 Drawing Sheet

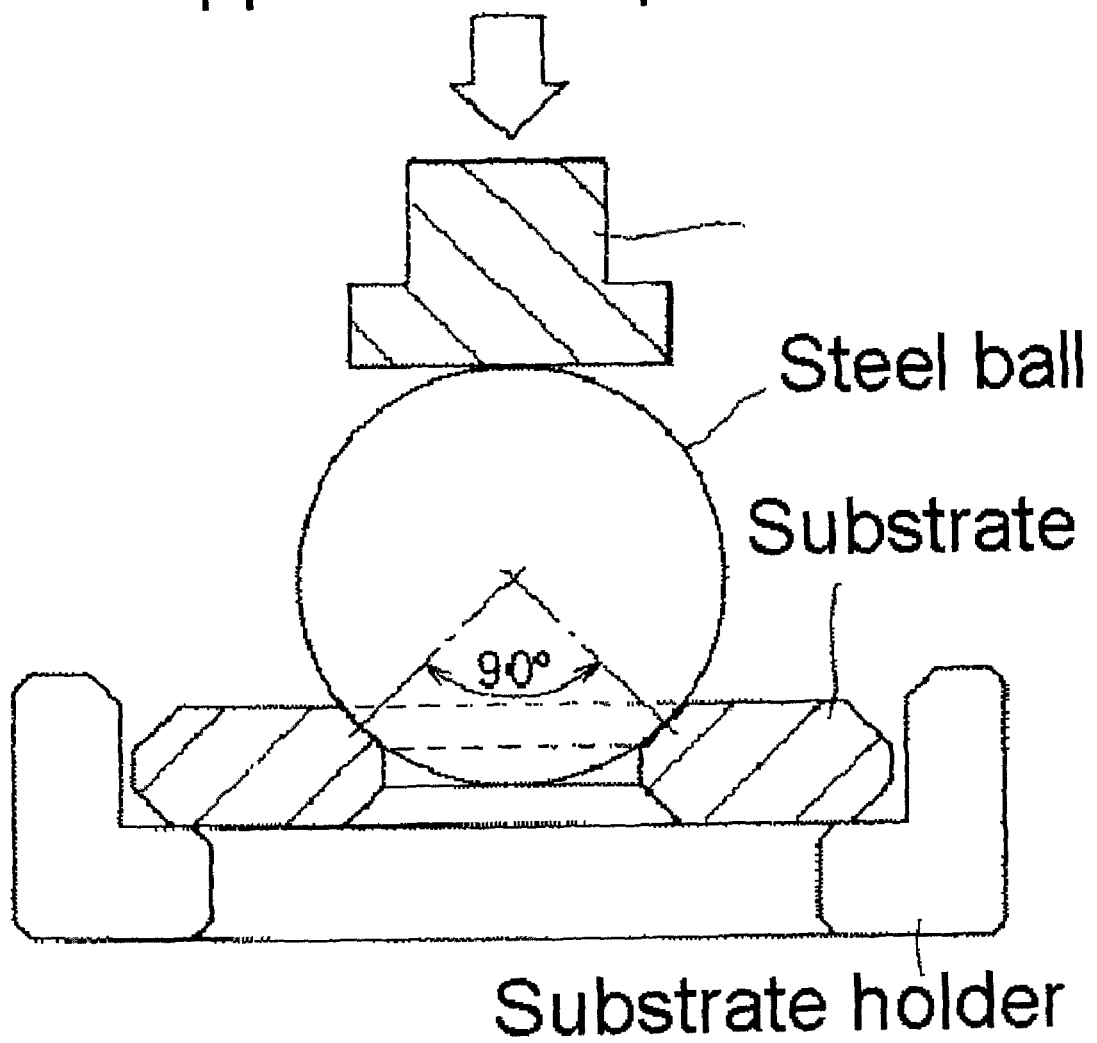

GLASS SUBSTRATE FOR MAGNETIC RECORDING MEDIUM AND MAGNETIC RECORDING MEDIUM

CROSS-REFERENCE TO RELATED APPLICATIONS

This application claims the benefit of priority under 35 USC 119 to Japanese Patent Application No. 2010-243069, filed on Oct. 29, 2010, which is expressly incorporated herein by reference in its entirety.

BACKGROUND OF THE INVENTION

1. Field of the Invention

The present invention relates to a glass substrate employed as a substrate in magnetic recording media such as hard disks, and to a magnetic recording medium comprising the above substrate.

With the development of information-related infrastructure such as the Internet, the need for information recording media such as magnetic disks and optical disks has increased sharply. The main structural components of the magnetic memory devices of computers and the like are magnetic recording media and magnetic heads for magnetic recording and reproduction. Known magnetic recording media include flexible disks and hard disks. Of these, examples of the substrate materials employed in hard disks (magnetic disks) include aluminum substrates, glass substrates, ceramic substrates, and carbon substrates. In practical terms, depending on size and application, aluminum substrates and glass substrates are primarily employed. In the hard disk drives of laptop computers, in addition to impact resistance, higher density recording, and the development of thinner magnetic recording media, the requirements of increased surface smoothness of the disk substrate and the development of thinner substrates are intensifying. Thus, there are limits to how well aluminum substrates, with afford poor surface hardness and rigidity, can respond. Accordingly, the development of glass substrates is currently the. mainstream (for example, see Document 1 (Published Japanese Translation of a PCT international publication for patent application (TOKUHYO) No. Heisei 9-507206), Document 2 (Japanese Unexamined Patent Publication (KOKAI) No. 2007-51064), Document 3 (Japanese Unexamined Patent Publication (KOKAI) No. 2001-294441), Document 4 (Japanese Unexamined Patent Publication (KOKAI) No. 2001-134925), Document 5 (Japanese Unexamined Patent Publication (KOKAI) No. 2001-348246), Document 6 (Japanese Unexamined Patent Publication (KOKAI) No. 2001-58843), Document 7 (Japanese Unexamined Patent Publication (KOKAI) No. 2006-327935), Document 8 (Japanese Unexamined Patent Publication (KOKAI) No. 2005-272212), or English language family members US 2005/215414A1 and U.S. Pat. No. 7,687,419, Document 9 (Japanese Unexamined Patent Publication (KOKAI) No. 2004-43295), Document 10 (Japanese Unexamined Patent Publication (KOKAI) No. 2005-314159), or English language family members US 2005/244656A1 and U.S. Pat. No. 7,595,273; which are expressly incorporated herein by reference in their entirety).

In recent years, with the goal of achieving even higher density recording in magnetic recording media, the use of magnetic materials of high magneto-anisotropic energy (magnetic materials of high Ku value), such as Fe-Pt and Co-Pt based materials, is being examined (for example, see Document 11 (Japanese Unexamined Patent Publication (KOKAI) No. 2004-362746) or English language family members US 2004/229006A1 and U.S. Pat. No. 7,189,438; which is expressly incorporated herein by reference in its entirety). It is necessary to reduce the particle diameter of the magnetic particles to achieve higher density recording. However, when just the particle diameter is reduced, the deterioration of magnetic characteristics due to thermal fluctuation becomes a problem. Magnetic materials of high Ku value tend not to be affected by thermal fluctuation, and are thus expected to contribute to the achievement of greater recording density.

However, the above-described magnetic materials of high Ku value must be in a specific state of crystal orientation to exhibit a high Ku value. Thus, a film must be formed at high temperature or thermoprocessing must be conducted at high temperature following film formation. Accordingly, the formation of a magnetic recording layer comprised of such magnetic materials of high Ku value requires that a glass substrate have high heat resistance that is capable of withstanding the above-described processing at high temperatures, that is, have a high glass transition temperature.

By the way, in disk-shaped magnetic recording media, data are written and read in the direction of rotation by radially displacing a magnetic head while rotating the medium at high speed about a center axis. In recent years, the rotational speed has been increased from 5,400 rpm to 7,200 rpm, and up to a high speed of 10,000 rpm to increase the writing rate and reading rate. However, in disk-shaped magnetic recording media, since the positions at which data are recorded are assigned in advance based on the distance from the center axis, when the disk deforms during rotation, the magnetic head develops a positional displacement, compromising proper reading. Accordingly, to cope with higher rotational speeds described above, the glass substrate is required to have high rigidity (Young's modulus) so as to prevent substantial deformation during high-speed rotation.

Furthermore, the use of a glass substrate with a high coefficient of thermal expansion permits an increase in the reliability of recording and reproduction with magnetic recording media for the following reasons.

HDDs (hard disk drives), in which magnetic recording media are loaded, are configured such that the spindle of a spindle motor presses against the center portion, causing the magnetic recording medium itself to rotate. Thus, when there is a substantial difference in the coefficient of thermal expansion of the substrate of the magnetic recording medium and spindle material constituting the spindle portion, a discrepancy ends up developing between the thermal expansion and contraction of the spindle and those of the substrate of the magnetic recording medium in response to change in the surrounding temperature during use. As a result, the phenomenon in which the magnetic recording medium ends up changing shape occurs. When such phenomenon occurs, information that has been written cannot be read by a head, compromising recording and reproduction reliability. Accordingly, enhancing the reliability of magnetic recording media requires that glass substrates have high coefficient of thermal expansion similar to that of the spindle material (such as stainless steel).

As set forth above, it is required for a glass substrate to have the characteristics of high heat resistance, high rigidity, and a high coefficient of thermal expansion to provide a magnetic recording medium capable of handling higher recording densities. However, based on investigation by the present inventors, conventional glass substrates, including the glass substrates described in Documents 1 to 10 above, do not simultaneously possess these characteristics. This is because there is a trade-off between these characteristics, making it difficult to achieve a glass substrate satisfying all.

A further example of a desirable characteristic of the glass substrate for a magnetic recording medium is a high chemical strengthening property (the ability to readily form an ion-exchange layer when subjected to a chemical strengthening treatment). This is because an ion-exchange layer (compressive stress layer) is often formed on the surface of the substrate by a chemical strengthening treatment to increase the resistance to fracture required for increased reliability of the glass substrate for a magnetic recording medium. The chemical strengthening treatment also has the effect of reducing the amount of alkali eluting from the surface of the glass substrate.

SUMMARY OF THE INVENTION

An aspect of the present invention provides for a magnetic recording medium with high heat resistance, high rigidity, a high coefficient of thermal expansion, and preferably, a high chemical strengthening property.

The present inventors repeatedly trial manufactured and evaluated a large number of glass compositions in an attempt to achieve the above object by trial and error. As a result, they discovered a glass having the characteristics of high heat resistance, high rigidity, and a high coefficient of thermal expansion, which have conventionally involved trade-offs and thus been difficult to achieve simultaneously, as well as having a high chemical strengthening property. The present invention was devised on that basis.

An aspect of the present invention relates to:

a glass substrate for a magnetic recording medium, which is comprised of glass comprising, denoted as molar percentages, 56 to 75 percent of $SiO_2$, 1 to 11 percent of $Al_2O_3$, more than 0 percent but equal to or less than 4 percent of $Li_2O$, equal to or more than 1 percent but less than 15 percent of $Na_2O$, equal to or more than 0 percent but less than 3 percent of $K_2O$, and substantially no BaO, with a total content of alkali metal oxides selected from the group consisting of $Li_2O$, $Na_2O$, and $K_2O$ falling within a range of 6 to 15 percent, with a molar ratio ($Li_2O/Na_2O$) of a content of $Li_2O$ to a content of $Na_2O$ being less than 0.50, with a molar ratio $\{K_2O/(Li_2O+Na_2O+K_2O)\}$ of a content of $K_2O$ to a total content of the above alkali metal oxides being equal to or less than 0.13, with a total content of alkaline earth metal oxides selected from the group consisting of MgO, CaO, and SrO falling within a range of 10 to 30 percent, with a total content of MgO and CaO falling within a range of 10 to 30 percent, with a molar ratio $\{(MgO+CaO)/(MgO+CaO+SrO)\}$ of a total content of MgO and CaO to a total content of the above alkaline earth metal oxides being equal to or more than 0.86, with a total content of the above alkali metal oxides and alkaline earth metal oxides falling within a range of 20 to 40 percent, with a molar ratio $\{(MgO+CaO+Li_2O)/(Li_2O+Na_2O+K_2O+MgO+CaO+SrO)\}$ of a total content of MgO, CaO, and $Li_2O$ to a total content of the above alkali metal oxides and alkaline earth metal oxides being equal to or more than 0.50, with a total content of oxides selected from the group consisting of $ZrO_2$, $TiO_2$, $Y_2O_3$, $La_2O_3$, $Gd_2O_3$, $Nb_2O_5$, and $Ta_2O_5$ being more than 0 percent but equal to or less than 10 percent, and with a molar ratio $\{(ZrO_2+TiO_2+Y_2O_3+La_2O_3+Gd_2O_3+Nb_2O_5+Ta_2O_5)/Al_2O_3\}$ of a total content of the above oxides to a content of $Al_2O_3$ content being equal to or more than 0.40, as well as the glass having a glass transition temperature of equal to or higher than 600° C., an average coefficient of linear expansion of equal to or higher than $70\times10^{-7}$/° C. at 100 to 300° C., and a Young's modulus of equal to or higher than 80 GPa.

The above glass substrate may be employed, in a magnetic recording medium having a magnetic recording layer comprising either Fe and Pt or Co and Pt on a substrate, as the substrate.

The above glass substrate may be employed as a substrate of a magnetic recording medium for energy-assisted recording.

The above glass substrate may be employed as a substrate of a magnetic recording medium for heat-assisted recording.

The above glass substrate may comprise an ion-exchange layer over a part or all of the surface thereof.

The above ion-exchange layer may have been formed by ion exchanging with at least one alkali metal ion selected from the group consisting of Na, K, Rb, and Cs.

The above glass substrate may have a specific modulus of elasticity of equal to or greater than 30.0 MNm/kg.

The above glass substrate may have a specific gravity of equal to or less than 2.90.

A further aspect of the present invention relates to a magnetic recording medium, which comprises a magnetic recording layer on the above glass substrate.

The above magnetic recording layer may comprise either Fe and Pt or Co and Pt.

The above magnetic recording medium may be a magnetic recording medium for energy-assisted recording.

The above magnetic recording medium may be a magnetic recording medium for heat-assisted recording.

In the above magnetic recording medium, the glass substrate may comprise an ion-exchange layer over a part or all of the surface thereof.

The above ion-exchange layer may have been formed by ion exchanging with at least one alkali metal ion selected from the group consisting of Na, K, Rb, and Cs.

The present invention can provide a magnetic recording medium comprising a glass substrate having high heat resistance capable of withstanding high-temperature heat processing in the course of forming a magnetic recording layer comprised of a high Ku value magnetic material, permitting the ready formation of an ion-exchange layer by a chemical strengthening treatment, having a high coefficient of thermal expansion matching that of the support member (spindle), and having high rigidity capable of withstanding high-speed rotation.

BRIEF DESCRIPTION OF THE DRAWINGS

FIG. 1 is a drawing descriptive of the method of measuring deflecting strength.

DETAILED DESCRIPTION OF THE EMBODIMENTS

An aspect of the present invention relates to a glass substrate for a magnetic recording medium, which is comprised of glass comprising, denoted as molar percentages, 56 to 75 percent of $SiO_2$,
1 to 11 percent of $Al_2O_3$,
more than 0 percent but equal to or less than 4 percent of $Li_2O$,
equal to or more than 1 percent but less than 15 percent of $Na_2O$,
equal to or more than 0 percent but less than 3 percent of $K_2O$, and
substantially no BaO,
with a total content of alkali metal oxides selected from the group consisting of $Li_2O$, $Na_2O$, and $K_2O$ falling within a range of 6 to 15 percent,
with a molar ratio ($Li_2O/Na_2O$) of a content of $Li_2O$ to a content of $Na_2O$ being less than 0.50,
with a molar ratio $\{K_2O/(Li_2O+Na_2O+K_2O)\}$ of a content of $K_2O$ to a total content of the above alkali metal oxides being equal to or less than 0.13,
with a total content of alkaline earth metal oxides selected from the group consisting of MgO, CaO, and SrO falling within a range of 10 to 30 percent,
with a total content of MgO and CaO falling within a range of 10 to 30 percent,
with a molar ratio $\{(MgO+CaO)/(MgO+CaO+SrO)\}$ of a total content of MgO and CaO to a total content of the above alkaline earth metal oxides being equal to or more than 0.86,
with a total content of the above alkali metal oxides and alkaline earth metal oxides falling within a range of 20 to 40 percent,
with a molar ratio $\{(MgO+CaO+Li_2O)/(Li_2O+Na_2O+K_2O+MgO+CaO+SrO)\}$ of a total content of MgO, CaO, and $Li_2O$ to a total content of the above alkali metal oxides and alkaline earth metal oxides being equal to or more than 0.50,
with a total content of oxides selected from the group consisting of $ZrO_2$, $TiO_2$, $Y_2O_3$, $La_2O_3$, $Gd_2O_3$, $Nb_2O_5$, and $Ta_2O_5$ being more than 0 percent but equal to or less than 10 percent, and
with a molar ratio $\{(ZrO_2+TiO_2+Y_2O_3+La_2O_3+Gd_2O_3+Nb_2O_5+Ta_2O_5)/Al_2O_3\}$ of a total content of the above oxides to a content of $Al_2O_3$ content being equal to or more than 0.40, as well as
the glass having a glass transition temperature of equal to or higher than 600° C., an average coefficient of linear expansion of equal to or higher than $70\times10^{-7}/°$ C. at 100 to 300° C., and a Young's modulus of equal to or higher than 80 GPa.

The glass substrate of the present invention has high heat resistance capable of withstanding high-temperature heat treatment in the course of forming a magnetic recording layer comprised of a high Ku value magnetic material, has a high coefficient of thermal expansion matching that of the support member (spindle), has high rigidity capable of withstanding high-speed rotation, and can have a good chemical strengthening property.

A further aspect of the present invention relates to a magnetic recording medium comprising a magnetic recording layer on the glass substrate of the present invention.

The present invention will be described in greater detail below.

The magnetic recording medium of the present invention can be a disk-shaped magnetic recording medium (referred to as a magnetic disk, hard disk, or the like) of laminated configuration comprised of, on the main surface of a glass substrate, and in order from the main surface outward, at least an adhesive layer, an undercoat layer, a magnetic layer (magnetic recording layer), a protective layer, and a lubricating layer.

For example, the glass substrate can be placed in a film-forming device in which a vacuum has been drawn, and the adhesive layer through the magnetic layer sequentially formed on the main surface of the glass substrate in an Ar atmosphere by the DC magnetron sputtering method. By way of example, CrTi can be employed as the adhesive layer and CrRu employed as the undercoat layer. Following this film formation, for example, CVD method can be used to form a protective film using $C_2H_4$, and a magnetic recording medium can be formed by a nitrogenation treatment incorporating nitrogen into the surface within the same chamber. Subsequently, for example, PFPE (polyfluoropolyether) can be coated on the protective layer by the dip coating method to form a lubricating layer.

Further, a soft magnetic layer, seed layer, intermediate layer, or the like can be formed between the undercoat layer and the magnetic layer by a known film-forming method such as sputtering method (DC magnetron sputtering method, RF magnetron sputtering method, or the like) or vacuum vapor deposition.

Reference can be made, for example, to paragraphs [0027] to [0032] of Japanese Unexamined Patent Publication (KO-KAI) No. 2009-110626, which is expressly incorporated herein by reference in its entirety. A heat sink layer comprised of a material of high thermoconductivity can be formed between the glass substrate and the soft magnetic layer, the details of which are given further below.

As set forth above, to achieve higher density recording on a magnetic recording medium, the magnetic recording layer is desirably formed of a magnetic material of high Ku. Examples of magnetic materials that are desirable from this perspective are Fe—Pt-based magnetic materials and Co—Pt-based magnetic materials. In this context, the term "based" means containing. That is, in the magnetic recording medium of the present invention, a magnetic recording layer in the form of a magnetic recording layer containing Fe and Pt, or Co and Pt, is desirable. For example, the film-forming temperature of magnetic materials that have conventionally been widely employed, such as Co—Cr-based materials, is about 250 to 300° C. By contrast, the film-forming temperature of Fe—Pt-based magnetic materials and Co—Pt-based magnetic materials is normally a high temperature exceeding 500° C. Further, to impart a crystalline orientation to these magnetic films following film formation, they are normally subjected to a high-temperature heat treatment (annealing) at a temperature exceeding the film-forming temperature. Accordingly, when using Fe—Pt-based magnetic materials or Co—Pt-based magnetic materials to form a magnetic recording layer, the substrate is exposed to this high temperature. In that case, when the glass constituting the substrate has poor heat resistance, it deforms at the high temperature and flatness is lost. By contrast, the substrate that is contained in the magnetic recording medium of the present invention exhibits good heat resistance (with a glass transition temperature of equal to or higher than 600° C.). Thus, even following the formation of a magnetic recording layer using an Fe—Pt-based magnetic material or a Co—Pt-based magnetic material, a high degree of flatness can be retained. The magnetic recording layer can be formed, for example, by forming a film of Fe—Pt-based magnetic material or Co—Pt-based magnetic material by DC magnetron sputtering in an Ar atmosphere and then conducting thermoprocessing at higher temperature in a heating furnace.

The Ku (crystal magnetic anisotropy energy constant) is proportional to the coercivity Hc. "Coercivity Hc" denotes the strength of the magnetic field that reverses the magnetization. As set forth above, magnetic materials of high Ku have resistance to thermal fluctuation. Thus, they are known to be materials in which magnetized regions tend not to deteriorate due to thermal fluctuation, even when extremely minute magnetic particles are employed, and are thus suited to high-density recording. However, since Ku and Hc are proportional, as stated above, the higher the Ku, the higher the Hc. That is, the reversal of magnetization by the magnetic head tends not to occur and the writing of information becomes difficult. Accordingly, the recording method of assisting the reversal of magnetization of a magnetic material of high Ku by instantaneously applying energy to the data writing region through the head to lower the coercivity when writing information with a magnetic head has gathered attention in recent years. Such recording methods are referred to as "energy-assisted recording methods." Among them, the recording method of assisting the reversal of magnetization by irradiating a laser beam is referred to as the "heat-assisted recording method," and the recording method that provides assistance by means of microwaves is referred to as the "microwave-assisted recording method". As set forth above, the present invention permits the formation of a magnetic recording layer with a magnetic material of high Ku. Thus, by combining a magnetic material of high Ku with energy-assisted recording, for example, it is possible to achieve high-density recording in which the surface recording density exceeds one terabyte/$inch^2$. That is, the magnetic recording medium of the present invention is preferably employed in an energy-assisted recording method. Heat-assisted recording methods are described in detail, for example, in IEEE Transactions on Magnetics, Vol. 44, No. 1, January 2008 119, which is expressly incorporated herein by reference in its entirety, and microwave-assisted recording methods are described in detail in, for example, IEEE Transactions on Magnetics, Vol. 44, No. 1, January 2008 125, which is expressly incorporated herein by reference in its entirety. Energy-assisted recording can also be conducted in the present invention by the methods described in these documents.

The dimensions of the magnetic recording medium substrate (for example, a magnetic disk glass substrate) and those of the magnetic recording medium (for example, a magnetic disk) of the present invention are not specifically limited. Because they are capable of high-density recording, the medium and substrate can be miniaturized. For example, they are suitable as magnetic disk substrates and magnetic disks with nominal diameters of 2.5 inches and even smaller (such as one inch).

The glass substrate of the present invention will be described below. In the following descriptions, unless specifically stated otherwise, the contents, total contents, and ratios of the various components are denoted on a mole basis.

The glass substrate of the present invention is comprised of oxide glass, and the composition thereof is denoted based on oxides. The term "glass composition based on oxides" is a glass composition that is obtained by conversion to the oxides that are present in the glass when all glass starting materials have been decomposed during melting. The glass substrate of the present invention is comprised of noncrystalline (amorphous) glass. Accordingly, in contrast to crystallized glass, since it is comprised of a homogenous phase, excellent substrate surface flatness can be achieved.

$SiO_2$ is a glass network-forming component that has the effect of enhancing glass stability, chemical durability, and in particular, acid resistance. It is a component that functions to lower the heat dispersion of the substrate and increase heating efficiency in the course of heating the substrate with radiation in the step of forming the magnetic recording layer and the like on the glass substrate for a magnetic recording medium and in the heat treatment of the film that is formed in the above step. When the $SiO_2$ content is less than 56 percent, chemical durability decreases, and at above 75 percent, it becomes difficult to obtain a rigid glass. When the $SiO_2$ content exceeds 75 percent, the $SiO_2$ does not melt completely, leaving unmelted material in the glass, rendering the viscosity of the glass excessively high during clarification, and resulting in inadequate elimination of bubbles from the glass. When a substrate is made from glass containing unmelted material, protrusions are produced by the unmelted material on the surface of the substrate by polishing, precluding its use as the substrate of a magnetic recording medium, which is required to have an extremely smooth surface. When a substrate is prepared from glass containing bubbles, polishing exposes portions of bubbles on the surface of the substrate. Those portions become pits, compromising the smoothness of the main surface of the substrate and precluding its use as a substrate in a magnetic recording medium. Thus, the $SiO_2$ content is 56 to 75 percent. The $SiO_2$ content desirably falls within a range of 58 to 70 percent, preferably within a range of 60 to 70 percent.

$Al_2O_3$ is also a component that contributes to forming the network of the glass, and enhances rigidity and heat resistance. However, the resistance to devitrification (stability) of the glass decreases when the content of $Al_2O_3$ exceeds 11 percent, so the quantity incorporated is equal to or less than 11 percent. Additionally, the stability, chemical durability, and heat resistance of the glass decrease when the content of $Al_2O_3$ is less than 1 percent. Thus, the quantity incorporated is equal to or more than 1 percent. Accordingly, the quantity of $Al_2O_3$ in the glass substrate of the present invention falls within the range of 1 to 11 percent. From the perspectives of glass stability, chemical durability, and heat resistance, the content of $Al_2O_3$ desirably falls within a range of 1 to 10 percent, preferably a range of 2 to 9 percent, and more preferably, within a range of 3 to 8 percent.

$Li_2O$ is a component that increases the rigidity of the glass, and is thus an essential component in the glass substrate of the present invention. The readiness of migration within the glass of the alkali metals is Li>Na>K. Thus, the incorporation of Li is advantageous from the perspective of the chemical strengthening property. However, the incorporation of an excessively large quantity tends to decrease heat resistance. Thus, the quantity incorporated is equal to or less than 4 percent. That is, the content of $Li_2O$ in the glass substrate of the present invention is greater than 0 percent but equal to or less than 4 percent. From the perspectives of high rigidity, high heat resistance, and the chemical strengthening property, the content of $Li_2O$ desirably falls within a range of 0.1 to 3.5 percent, preferably falls within a range of 0.5 to 3 percent, more preferably falls within a range of greater than 1 percent but equal to or less than 3 percent, and still more preferably, falls with in a range of greater than 1 percent but equal to or less than 2.5 percent.

As set forth above, the incorporation of an excessive quantity of $Li_2O$ tends to decrease heat resistance. The incorporation of an excessive quantity of $Na_2O$ also tends to decrease heat resistance. Thus, the quantity that is incorporated is adjusted relative to the quantity of $Na_2O$ that is incorporated so that the molar ratio of the quantity of $Li_2O$ to the quantity of $Na_2O$ ($Li_2O/Na_2O$) falls within a range of less than 0.50. From the perspective of preventing a drop in heat resistance while achieving an effect by introducing $Li_2O$, the molar ratio of ($Li_2O/Na_2O$) desirably falls within a range of equal to or higher than 0.01 to less than 0.50, preferably within a range of 0.02 to 0.40, more preferably within a range of 0.03 to 0.40, still more preferably within a range of 0.04 to 0.30, and yet still more preferably, within a range of 0.05 to 0.30.

Additionally, the quantity of $Li_2O$ incorporated tends to decrease heat resistance when excessively high, and decrease the chemical strengthening property when excessively low, relative to the total content of alkali metal oxides ($Li_2O+Na_2O+K_2O$). Thus, the quantity of $LiO_2$ incorporated is desirably adjusted relative to the total content of alkali metal oxides so that the molar ratio of $\{Li_2O/(Li_2O+Na_2O+K_2O)\}$ of the $Li_2O$ content relative to the total content of alkali metal oxides falls within a range of less than 1/3. From the perspective of preventing a drop in heat resistance while achieving an effect by introducing $Li_2O$, the upper limit of the molar ratio of $\{Li_2O/(Li_2O+Na_2O+K_2O)\}$ is preferably 0.28, and more preferably, 0.23. From the perspective of preventing a decrease in the chemical strengthening property, the lower limit of the molar ratio of $\{Li_2O/(Li_2O+Na_2O+K_2O)\}$ is desirably 0.01, preferably 0.02, more preferably 0.03, still more preferably 0.04, and yet still more preferably, 0.05.

$Na_2O$ is an effective component for improving the thermal expansion characteristic, and is thus incorporated as an essential component of the glass substrate of the present invention in a proportion of equal to or more than 1 percent. $Na_2O$ is a component that also contributes to the chemical strengthening property, and is thus advantageously incorporated in a quantity of equal to or more than 1 percent from the perspective of the chemical strengthening property. However, the incorporation of a quantity of equal to or more than 15 percent tends to decrease heat resistance. Accordingly, the content of $Na_2O$ in the glass substrate of the present invention is equal to or more than 1 percent but less than 15 percent. From the perspectives of thermal expansion characteristics, heat resistance, and the chemical strengthening property, the content of $Na_2O$ desirably falls within a range of 4 to 13 percent, and preferably falls within a range of 5 to 11 percent.

$K_2O$ is an effective component for improving the thermal expansion characteristic, and is thus an optional component for incorporation in the glass substrate of the present invention. The incorporation of an excessively large quantity tends to decrease heat resistance and thermoconductivity and compromise the chemical strengthening property. Thus, the quantity incorporated is less than 3 percent. That is, the content of $K_2O$ in the glass substrate of the present invention is equal to or more than 0 percent but less than 3 percent. From the perspective of enhancing the thermal expansion characteristic while maintaining heat resistance, the content of $K_2O$ desirably falls within a range of 0 to 2 percent, preferably within a range of 0 to 1 percent, more preferably within a range of 0 to 0.5 percent, and still more preferably, within a range of 0 to 0.1 percent. From the perspectives of heat resistance and the chemical strengthening property, it is desirably substantially not incorporated. In the present invention, the phrases "substantially not containing" and "substantially not incorporated" mean that a specific component is not intentionally added to the glass starting materials, but its presence as an impurity is not excluded. The statement of "0 percent of the glass composition" has the same meaning.

When the total content of alkali metal oxides selected from the group consisting of $Li_2O$, $Na_2O$, and $K_2O$ in the glass substrate of the present invention is less than 6 percent, the meltability and thermal expansion characteristic of the glass decrease, and when it exceeds 15 percent, heat resistance decreases. Accordingly, from the perspectives of the glass meltability, thermal expansion characteristic, and heat resistance, the total content of alkali metal oxides selected from the group consisting of $Li_2O$, $Na_2O$, and $K_2O$ in the glass substrate of the present invention is 6 to 15 percent, desirably 7 to 15 percent, preferably 8 to 13 percent, and more preferably, falls within a range of 8 to 12 percent.

The glass substrate of the present invention substantially contains no BaO. The incorporation of BaO is excluded for the following reasons.

To increase recording density, it is necessary to reduce the distance between the magnetic head and the surface of the magnetic recording medium and increase the read and write resolution. Thus, in recent years, reduction in the height at which the head floats (reduction in the spacing between the magnetic head and the surface of the magnetic recording medium) has progressed. As a result, the presence of even minute protrusions on the surface of the magnetic recording medium is no longer tolerated. In recording and reproducing systems with low floating levels, even minute protrusions collide with the head, damaging the head element and the like. Additionally, BaO reacts with carbonic acid gas in the atmosphere, producing $BaCO_3$, which adheres to the surface of the glass substrate. Accordingly, BaO is not incorporated from the perspective of reducing deposits. In addition, BaO is a component that may cause change in the property of the glass surface (referred to as weathering), creating the risk of the formation of minute protrusions on the substrate surface. Thus, BaO is excluded to prevent weathering of the glass surface. Ba-free glass is also desirable to reduce the burden on the environment.

Additionally, the glass substrate containing substantially no BaO is desirable in a magnetic recording medium in which a heat-assisted recording method is employed. The reasons for this are as follows.

The higher the recording density, the smaller the bit size employed. For example, the target value of the bit size for achieving high density recording exceeding one terabyte/$inch^2$ is a diameter of several tens of nanometers. When recording at such a minute bit size, the area that is heated in heat-assisted recording must be about the same as the bit size. To conduct high-speed recording at a minute bit size, the time that is expended on recording a single bit becomes extremely short. Thus, heat-assisted heating and cooling must be instantaneously completed. That is, the heating and cooling of a magnetic recording medium that is employed in heat-assisted recording must be conducted in as rapid and localized a fashion as possible.

Accordingly, the positioning of a heat sink layer comprised of a highly thermoconductive material (such as a Cu film) between the substrate and the magnetic recording layer of a magnetic recording medium for heat-assisted recording has been proposed (for example, see Japanese Unexamined Patent Publication (KOKAI) No. 2008-52869, which is expressly incorporated herein by reference in its entirety). The heat sink layer prevents heat diffusion in in-plane directions and accelerates the flow of heat in the vertical (depth) direction, thereby serving as a layer that causes heat applied to the recording layer to escape not in an in-plane direction, but in the vertical (thickness) direction. The thicker the heat sink layer is made, the more rapidly and more localized the fashion in which heat and cooling can be implemented. However, the formation of a thick heat sink layer requires a long film formation period, compromising productivity. Increasing the thickness of the heat sink layer also increases the amount of heat accumulating during film formation, effectively disrupting the crystallinity and crystal orientation of the magnetic layer formed over it and sometimes making it difficult to improve recording density. Further, the thicker the heat sink layer becomes, the greater the possibility that corrosion will occur in the heat sink layer, causing the film as a whole to mound up and generate convex defects and hindering a low flotation level. When iron materials are employed in the heat sink layer, in particular, the potential of this phenomenon occurring is high.

Providing a thick heat sink layer as set fort above affords advantages in terms of achieving rapid and localized heating and cooling, but is undesirable from the perspectives of productivity, increasing recording density, and reducing the flotation level. As a countermeasure, it is conceivably possible to increase the thermoconductivity of the glass substrate to complement the role of the heat sink layer.

The glass substrate of the present invention is comprised of components in the form of $SiO_2$, $Al_2O_3$, alkali metal oxides, alkaline earth metal oxides, and the like. Among these, the alkali metal oxides and alkaline earth metal oxides function as modifying components to improve the meltability of the glass and increase its coefficient of thermal expansion. Accordingly, they must be incorporated into the glass in certain quantities. Among them, Ba, which has the highest atomic number, has the greatest effect in lowering the thermoconductivity of a glass. Since the glass substrate of the present invention contains no BaO, there is no reduction in thermoconductivity due to BaO. Accordingly, even with a thin heat sink layer, heating and cooling can be conducted in rapid and localized fashion.

Among the alkaline earth metal oxides, BaO functions to maintain the highest glass transition temperature. In the glass substrate of the present invention, the molar ratio $\{(MgO+CaO)/(MgO+CaO+SrO)\}$ of the total content of MgO and CaO to the total content of MgO, CaO, and SrO is set to equal to or more than 0.86 so as to prevent a decrease in the glass transition temperature due to not employing BaO. This is because for a given total quantity of alkaline earth metal oxides, it is possible to maintain a higher glass transition temperature by using a blend that concentrates the total quantity in one or two alkaline earth metal oxides than by means of a blend employing multiple alkaline earth metal oxides. That is, in the glass substrate of the present invention, it is possible to suppress the drop in the glass transition temperature due to not employing BaO by setting the above molar ratio to equal to or more than 0.86. As set forth above, one of the characteristics required of a glass substrate is high rigidity (high Young's modulus). A low specific gravity is another characteristic that is desirable in a glass substrate, as set forth further below. To achieve a high Young's modulus and a low specific gravity, alkaline earth metal oxides in the form of MgO and CaO are advantageously incorporated with preference. Accordingly, keeping the above molar ratio to equal to or more than 0.86 also has the effect of achieving a high Young's modulus and a low specific gravity in the glass substrate. From the above-described perspectives, the above molar ratio is desirably equal to or more than 0.88, preferably equal to or more than 0.90, more preferably equal to or more than 0.93, still more preferably equal to or more than 0.95, even more preferably equal to or more than 0.97, yet more preferably equal to or more than 0.98, yet still more preferably equal to or more than 0.99, and optimally, 1.

When the total content of alkaline earth metal oxides selected from the group consisting of MgO, CaO, and SrO is excessively low, the rigidity and thermal expansion characteristic of the glass decrease; when excessively high, chemical durability drops. To achieve high rigidity, high thermal expansion characteristic, and good chemical durability in the glass substrate of the present invention, the total content of the above alkaline earth metal oxides is set to 10 to 30 percent, desirably 10 to 25 percent, preferably to 11 to 22 percent, more preferably to 12 to 22 percent, still more preferably to 13 to 21 percent, and yet still more preferably, to within a range of 15 to 20 percent.

As set forth above, MgO and CaO are components that are preferentially incorporated in a total content of 10 to 30 percent. When the total content of MgO and CaO is less than 10 percent, rigidity and the thermal expansion characteristic decrease. When it exceeds 30 percent, chemical durability drops. From the perspective of achieving a good effect by preferentially incorporating MgO and CaO, the range of the total content of MgO and CaO is desirably 10 to 25 percent, preferably 10 to 22 percent, more preferably 11 to 20 percent, and still more preferably, 12 to 20 percent.

Further, among the alkali metal oxides, $K_2O$ has a high atomic number, functions to greatly lower thermal conductivity, and is disadvantageous from the perspective of the chemical strengthening property. Thus, the content of $Li_2O$ is limited with respect to the total content of alkali metal oxides. In the glass substrate of the present invention, the molar ratio $\{K_2O/(Li_2O+Na_2O+K_2O)\}$ of the $K_2O$ content to the total content of the alkali metal oxides is set to 0.13. From the perspectives of the chemical strengthening property and thermal conductivity, this molar ratio is desirably equal to or lower than 0.10, preferably equal to or lower than 0.08, more preferably equal to or lower than 0.06, still more preferably equal to or lower than 0.05, even more preferably equal to or lower than 0.03, yet even more preferably equal to or lower than 0.02, yet still more preferably equal to or lower than 0.01, and optimally, substantially zero. That is, $K_2O$ is optimally not incorporated.

The total content ($Li_2O+Na_2O+K_2O+MgO+CaO+SrO$) of the alkali metal oxides and the alkaline earth metal oxides in the glass substrate of the present invention is 20 to 40 percent. This is because at less than 20 percent, glass meltability, the coefficient of thermal expansion, and rigidity decrease, and at greater than 40 percent, chemical durability and resistance to heat diminish. From the perspective of maintaining various characteristics described above in a good level, the total content of the alkali metal oxides and alkaline earth metal oxides desirably falls within a range of 20 to 35 percent, preferably within a range of 21 to 33 percent, and more preferably, within a range of 23 to 33 percent.

As set forth above, MgO, CaO, and $Li_2O$ are effective components for achieving high glass rigidity (a high Young's modulus). When the total of these three components is excessively low relative to the total of the alkali metal oxides and alkaline earth metal oxides, it becomes difficult to achieve a high Young's modulus. Accordingly, in the glass substrate of the present invention, the total content of MgO, CaO, and $Li_2O$ incorporated is adjusted relative to the total content of the alkali metal oxides and alkaline earth metal oxides to achieve a molar ratio $\{(MgO+CaO+Li_2O)/(Li_2O+Na_2O+K_2O+MgO+CaO+SrO)\}$ of MgO, CaO, and $Li_2O$ to the total content of the alkali metal oxides and alkaline earth metal oxides of equal to or more than 0.50. To achieve a glass substrate with an even higher Young's modulus, this molar ratio is desirably equal to or more than 0.51, preferably equal to or more than 0.52. From the perspective of glass stability, this molar ratio is desirably equal to or les than 0.80, preferably equal to or les than 0.75, and more preferably, equal to or les than 0.70.

With regard to the quantity of individual alkaline earth metal oxides incorporated, no BaO is substantially incorporated as set forth above.

From the perspectives of raising the Young's modulus, lowering the specific gravity, and increasing the specific modulus of elasticity, the MgO content is desirably 0 to 14 percent, preferably 0 to 10 percent, more preferably 0 to 8 percent, still more preferably 0 to 6 percent, and yet more preferably, falls within a range of 1 to 6 percent. The specific modulus of elasticity will be described further below.

From the perspectives of enhancing the thermal expansion characteristics and Young's modulus and lowering the specific gravity, CaO is desirably incorporated in a quantity of 3 to 20 percent, preferably 4 to 20 percent, and more preferably, within a range of 10 to 20 percent.

SrO is a component that improves the thermal expansion characteristic, but also raises the specific gravity more than MgO and CaO. It is thus desirably incorporated in a quantity of equal to or less than 4 percent, preferably equal to or less than 3 percent, more preferably equal to or less than 2.5 percent, still more preferably equal to or less than 2 percent, yet still more preferably equal to or less than 1 percent, and may be substantially not incorporated.

The contents and proportions of $SiO_2$, $Al_2O_3$, alkali metal oxides, and alkaline earth metal oxides in the glass substrate of the present invention are as set forth above. The glass substrate of the present invention also contains the oxide components indicated below. They will be described in detail below.

At least one oxide selected from the group consisting of $ZrO_2$, $TiO_2$, $Y_2O_3$, $La_2O_3$, $Gd_2O_3$, $Nb_2O_5$, and $Ta_2O_5$ is incorporated as a component to increase rigidity and heat resistance. However, the incorporation of an excessive quantity lowers glass meltability and the thermal expansion characteristic. Thus, the total content of these oxides in the glass substrate of the present invention exceeds 0 percent but does not exceed 10 percent, is desirably 1 to 10 percent, preferably 2 to 10 percent, more preferably 2 to 9 percent, still more preferably 2 to 7 percent, and yet still more preferably, falls within a range of 2 to 6 percent.

As set forth above, $Al_2O_3$ is a component that increases rigidity and heat resistance. However, the above oxides function more greatly to raise Young's modulus. The above oxides are incorporated in a molar ratio of equal to or more than 0.4 relative to $Al_2O_3$. That is, the molar ratio $\{(ZrO_2+TiO_2+Y_2O_3+La_2O_3+Gd_2O_3+Nb_2O_5+Ta_2O_5)/Al_2O_3\}$ of the total content of the above oxides to the $Al_2O_3$ content is set to equal to or more than 0.40, thereby making it possible to increase rigidity and heat resistance. From the perspective of further improving rigidity and heat resistance, this molar ratio is desirably equal to or more than 0.50, preferably equal to or more than 0.60, and more preferably, equal to or more than 0.70. From the perspective of glass stability, this molar ratio is desirably equal to or less than 4.00, preferably equal to or less than 3.00, more preferably equal to or less than 2.00, still more preferably equal to or less than 1.00, yet still more preferably equal to or less than 0.90, and even still more preferably, equal to or less than 0.85.

$B_2O_3$ is a component that reduces brittleness of the glass substrate and increases glass meltability. However, the incorporation of an excessive quantity lowers heat resistance. Thus, the quantity incorporated is desirably 0 to 3 percent, preferably 0 to 2 percent, more preferably 0 percent or higher but less than 1 percent, still more preferably 0 to 0.5 percent, with substantially no incorporation being possible.

$Cs_2O$ is a component that can be incorporated in a small quantity within a range at which desired characteristics and properties are not compromised. However, it is a component that increases the specific gravity more than other alkali metal oxides, and so may be substantially not incorporated.

ZnO is a component that increases glass meltability, moldability, stability, rigidity, and the thermal expansion characteristic. However, the incorporation of an excessive quantity lowers heat resistance and chemical durability. Thus, the quantity incorporated is desirably 0 to 3 percent, preferably 0 to 2 percent, and more preferably, 0 to 1 percent, with substantially no incorporation being possible.

As set forth above, $ZrO_2$ is a component that increases rigidity and heat resistance and enhances chemical durability. However, the incorporation of an excessive quantity reduces glass meltability. Thus, the quantity incorporated is desirably 1 to 8 percent, preferably 1 to 6 percent, and more preferably, 2 to 6 percent.

$TiO_2$ is a component that serves to suppress an increase in specific gravity and increase rigidity, thereby increasing the specific modulus of elasticity. However, the incorporation of an excessive quantity sometimes produces reaction products between the substrate surface and water when the glass substrate comes into contact with water, producing deposits. Thus, the quantity incorporated is desirably 0 to 6 percent, preferably 0 to 5 percent, more preferably 0 to 3 percent, still more preferably 0 to 2 percent, yet still more preferably equal to or more than 0 percent but less than 1 percent, with substantially no incorporation being possible.

$Y_2O_3$, $Yb_2O_3$, $La_2O_3$, $Gd_2O_3$, $Nb_2O_5$, and $Ta_2O_5$ are advantageous components from the perspectives of increasing chemical durability, enhancing heat resistance, and improving rigidity and fracture toughness. However, their incorporation in an excessively large quantity compromises meltability and increases the specific gravity. They also involve the use of expensive starting materials. Thus, their content is desirably kept low. Accordingly, the total content of these components that is incorporated is desirably 0 to 3 percent, preferably 0 to 2 percent, more preferably 0 to 1 percent, still more preferably 0 to 0.5 percent, and yet still more preferably, 0 to 0.1 percent. When emphasizing improved meltability, low specific gravity, and reduced cost, it is desirable to substantially not incorporate them.

$HfO_2$ is also a component that is advantageous from the perspectives of enhancing chemical durability and heat resistance, and increasing rigidity and fracture toughness. However, the incorporation of an excessive quantity compromises meltability and increases the specific gravity. It also involves the use of expensive starting materials, and is thus desirably employed only in a small quantity, or substantially not employed at all.

Taking into account the environmental effects of Pb, As, Cd, Te, Cr, Tl, U, and Th, they are desirably substantially not incorporated at all.

From the perspective of increasing both heat resistance and meltability, the molar ratio of $\{(SiO_2+Al_2O_3+ZrO_2+TiO_2+Y_2O_3+La_2O_3+Gd_2O_3+Nb_2O_5+Ta_2O_5)/(Li_2O+Na_2O+K_2O)\}$ of $SiO_2$, $Al_2O_3$, $ZrO_2$, $TiO_2$, $Y_2O_3$, $La_2O_3$, $Gd_2O_3$, $Nb_2O_5$, and $Ta_2O_5$ to the total content of the above alkali metal oxides ($Li_2O$, $Na_2O$, and $K_2O$) desirably falls within a range of 3 to 15, preferably 3 to 12, more preferably 4 to 12, still more preferably 5 to 12, yet still more preferably 5 to 11, and yet still more preferably, falls within a range of 5 to 10.

Various characteristics of the glass substrate of the present invention will be described below.

1. Coefficient of Thermal Expansion

As set forth above, when there is a large difference in coefficient of thermal expansion between the glass constituting the glass substrate for a magnetic recording medium and the spindle material (such as stainless steel) of an HDD, changes in temperature during the operation of the HDD cause the magnetic recording medium to deform, problems occur in recording and reproduction, and reliability ends up being compromised. In particular, in magnetic recording media having a magnetic recording layer comprised of a magnetic material of high Ku, the recording density is extremely high. Thus, even slight deformation of the magnetic recording medium tends to cause these problems. Generally, the spindle material of an HDD material has an average coefficient of linear expansion (coefficient of thermal expansion) of equal to or greater than $70\times10^{-7}/°$ C. over a temperature range of 100 to 300° C. The glass substrate of the present invention can be used to provide a substrate that is suited to a magnetic recording medium having a magnetic recording layer comprised of a magnetic material of high Ku with an average coefficient of linear expansion of equal to or greater than $70\times10^{-7}/°$ C. over a temperature range of 100 to 300° C. and thus enhance reliability. The average coefficient of linear expansion can be controlled by adjusting contents and proportions of glass components set forth above as those affecting the thermal expansion characteristics. The average coefficient of linear expansion desirably falls within a range of equal to or greater than $71\times10^{-7}/°$ C., preferably within a range of equal to or greater than $72\times10^{-7}1°$ C., more preferably within a range of equal to or greater than $73\times10^{-7}/°$ C., still more preferably within a range of equal to or greater than $74\times10^{-7}/°$ C., even more preferably within a range of equal to or greater than $75\times10^{-7}/°$ C. Taking into account the thermal expansion characteristics of the spindle material, the upper limit of the average coefficient of linear expansion is, for example, desirably about $120\times10^{-7}/°$ C., preferably $100\times10^{-7}/°$ C., and more preferably, $88\times10^{-7}/°$ C.

2. Glass Transition Temperature

When attempting to increase the recording density of a magnetic recording medium by incorporating a magnetic material of high Ku or the like as set forth above, the glass substrate for a magnetic recording medium is exposed to high temperatures during high temperature processing of the magnetic material. In this process, to prevent loss of the extremely high degree of flatness of the substrate, good heat resistance is demanded of the glass substrate for a magnetic recording medium. The glass transition temperature is employed as an index of heat resistance. The glass substrate of the present invention has a glass transition temperature of equal to or higher than 600° C., making it possible to maintain good flatness following high temperature processing. Accordingly, the glass substrate of the present invention is suited to the preparation of a magnetic recording medium comprising a magnetic material of high Ku. The glass transition temperature can be controlled by adjusting contents and proportions of glass components set forth above as those affecting the heat resistance. The glass transition temperature desirably falls within a range of equal to or higher than 610° C., preferably within a range of equal to or higher than 620° C., more preferably within a range of equal to or higher than 630° C. The upper limit of the glass transition temperature is, for example, about 750° C., but is not specifically limited because higher glass transition temperature is preferred.

3. Young's Modulus

Deformation of a magnetic recording medium includes deformation due to high speed rotation in addition to deformation due to change in the temperature of an HDD. To inhibit deformation during high speed rotation, it is required to increase the Young's modulus of the substrate for a magnetic recording medium. The glass substrate of the present invention has a Young's modulus of equal to or higher than 80 GPa, thereby inhibiting deformation in the substrate during high speed rotation and permitting the accurate reading and writing of data even on a magnetic recording medium of increased recording density comprising a magnetic material of high Ku. The glass transition temperature can be controlled by adjusting contents and proportions of glass components set forth above as those affecting the rigidity. The Young's modulus desirably falls with a range of equal to or higher than 81 GPa, preferably within a range of equal to or higher than 82 GPa, more preferably within a range of equal to or higher than 83 GPa, further preferably within a range of equal to or higher than 84 GPa, still more preferably within a range of equal to or higher than 85 GPa, even more preferably within a range of equal to or higher than 86 GPa. The upper limit of the Young's modulus can be, for example, about 95 GPa, but is not specifically limited because higher Young's modulus is preferred.

4. Specific Modulus of Elasticity and Specific Gravity

From the perspective of suppressing the deformation (flexure of the substrate) when the magnetic recording medium is rotated at high speed, the specific modulus of elasticity of the glass substrate of the present invention is desirably equal to or higher than 30.0 MNm/kg, preferably higher than 30.0 MNm/kg, more preferably equal to or higher than 30.5 MNm/kg. The upper limit is, for example, about 40.0 MNm/kg, but is not specifically limited. The specific modulus of elasticity is obtained by dividing the Young's modulus of the glass by its density. In this context, the density can be thought of as a quantity obtained by expressing the specific gravity of the glass in units of $g/cm^3$. Achieving a glass of low specific gravity makes it possible to lighten the substrate in addition to increasing the specific modulus of elasticity. Lightening the substrate can reduce the weight of the magnetic recording medium, thus reduce the electric power required to rotate the magnetic recording medium, and inhibit power consumption by an HDD. The specific gravity of the glass substrate of the present invention desirably falls within a range of equal to or less than 2.90, preferably within a range of equal to or less than 2.80, more preferably, with a range of less than 2.70. The specific gravity of the glass substrate can be controlled by adjusting contents and proportions of glass components set forth above as those affecting the specific gravity.

5. Acid Resistance

In the course of producing the glass substrate for a magnetic recording medium, the glass is processed into a disk shape and the main surface is processed to be extremely flat and smooth. Following these processing steps, normally, the glass substrate is cleaned with an acid to remove grime in the form of organic material that has adhered to the surface. In that case, when the glass substrate has poor acid resistance, the cleaning with an acid roughens the surface, flatness and smoothness are lost, and the glass substrate cannot be readily used in a magnetic recording medium. In a glass substrate for a magnetic recording medium with high recording density having a magnetic recording layer comprised of a magnetic material of high Ku in which high flatness and smoothness of the glass substrate surface are required, good acid resistance is particularly desirable.

A substrate that is rendered even cleaner by removing foreign matter such as abrasive that has adhered to the surface can be obtained by cleaning with an alkali following cleaning with an acid. To prevent a decrease in flatness and smoothness of the surface of the substrate due to roughening during cleaning with an alkali, the glass substrate desirably has good alkali resistance. Good acid resistance and alkali resistance that render high flatness and smoothness of the substrate surface are also advantageous from the perspective of low floating levels, as set forth above. In the present invention, good acid resistance and alkali resistance can be achieved by conducting adjustment of the glass composition described above, especially, by conducting adjustment of the composition that is advantageous for chemical durability.

6. Liquidus Temperature

In the course of melting glass and molding the glass melt obtained, the glass crystallizes and a homogenous glass cannot be produced when the molding temperature is lower than the liquidus temperature. Thus, the glass molding temperature must be greater than or equal to the liquidus temperature. However, when the molding temperature exceeds 1,300° C., for example, the pressing mold employed in the course of press molding a glass melt reacts with the hot glass and tends to be damaged. Even when conducting molding by casting a glass melt into a casting mold, the casting mold tends to be similarly damaged. Taking these points into account, the liquidus temperature of the glass constituting the glass substrate of the present invention is desirably equal to or lower than 1,300° C. The liquidus temperature preferably falls within a range of equal to or lower than 1,280° C., more preferably a range of equal to or lower than 1,250° C. In the present invention, the liquidus temperature within the above desirable range can be achieved by conducting adjustment of glass composition described above. The lower limit is not specifically limited, but a temperature of equal to or higher than 800° C. can be thought of as a yardstick.

7. Spectral Transmittance

A magnetic recording medium is produced by a process of forming a multilayered film comprising a magnetic recording layer on a glass substrate. In the course of forming a multilayered film on a substrate by the single substrate film forming method that is currently the mainstream, for example, the glass substrate is first introduced into the substrate heating region of a film-forming device and heated to a temperature at which film formation by sputtering or the like is possible. Once the temperature of the glass substrate has risen adequately, the glass substrate is moved to a first film-forming region where a film corresponding to the lowest layer of the multilayer film is formed on the glass substrate. Next, the glass substrate is moved to a second film-forming region where a film is formed over the lowermost layer. The multilayered film is thus formed by sequentially moving the glass substrate to subsequent film-forming regions and forming films. Since the heating and film formation are conducted under reduced pressure achieved by evacuation with a vacuum pump, heating of the substrate must be conducted by a non-contact method. Thus, the glass substrate is suitably heated by radiation. This film formation must be conducted while the glass substrate is not at a temperature that is lower than the temperature suited to film formation. When the time required for forming each layer of the film is excessively long, the temperature of the glass substrate that has been heated drops, and there is a problem in that it is impossible to achieve an adequate glass substrate temperature in subsequent film-forming regions. To maintain the glass substrate at a temperature permitting film formation for an extended period, heating the substrate to a higher temperature is conceivable. However, when the heating rate of the glass substrate is low, the heating period must be extended, and the time during which the glass substrate remains in the heating region must be increased. Thus, the residence time of the glass substrate in each film-forming region increases, and an adequate glass substrate temperature ends up not being maintained in subsequent film-forming regions. Further, it becomes difficult to increase throughput. In particular, when producing a magnetic recording medium comprising a magnetic recording layer comprised of a magnetic material of high Ku, it is desirable to further increase the efficiency of heating the glass substrate with radiation so as to heat the glass substrate to a high temperature within a prescribed period.

In glasses containing $SiO_2$ and $Al_2O_3$, absorption peaks are present in the region containing the wavelengths of 2,750 to 3,700 nm. The absorption of radiation at shorter wavelengths can be increased by adding an infrared-absorbing agent, described further below, or by incorporating it as a glass component, thereby imparting absorption in the wavelength range of wavelengths of 700 to 3,700 nm. The use of infrared radiation having a spectral maximum in the above wavelength range is desirable to efficiently heat the glass substrate with radiation, that is, by irradiation with infrared radiation. It is conceivable to increase the power of the infrared radiation while matching the maximum spectral wavelength of the infrared radiation with the peak absorption wavelength of the substrate. Taking the example of a high-temperature carbon heater as an infrared source, it suffices to increase the input to the carbon heater to increase the power of the infrared radiation. However, considering the radiation from the carbon heater as black body radiation, an increase in the input increases the heater temperature. This shifts the maximum wavelength of the infrared radiation spectrum to the short wavelength side, ending up outside the absorption wavelength region of the glass. Thus, the powder consumption of the heater must be made excessively high to increase the heating rate of the substrate, creating a problem by shortening the service lifetime of the heater or the like.

In light of such problems, increasing the absorption of the glass in the above wavelength region (wavelengths 700 to 3,700 nm), irradiating infrared radiation with the maximum spectral wavelength of the infrared radiation in a state of proximity to the peak absorption wavelength of the substrate, and not employing an excessive heater input are desirable. Accordingly, to increase the infrared radiation heating efficiency, either the presence of a region in which the spectral transmittance as converted to a thickness of 2 mm is equal to or less than 50 percent in the 700 to 3,700 nm wavelength region in the glass substrate, or a glass substrate with transmittance characteristics such that the spectral transmission as converted to a thickness of 2 mm is equal to or less than 70 percent over the above wavelength region is desirable. For example, the oxide of at least one metal selected from the group consisting of iron, copper, cobalt, ytterbium, manganese, neodymium, praseodymium, niobium, cerium, vanadium, chromium, nickel, molybdenum, holmium, and erbium can function as an infrared-absorbing agent. Further, water or OH groups contained in water absorb strongly in the 3 μm band, so water can also function as an infrared-absorbing agent. Incorporating a suitable quantity of a component that is capable of functioning as the above infrared-absorbing agent into the glass composition can impart the above desirable absorption characteristic to the glass substrate. The quantity added of the oxide that is capable of functioning as the infrared-absorbing agent is desirably 500 ppm to 5 percent, preferably 2,000 ppm to 5 percent, more preferably 2000 ppm to 2 percent, and still more preferably, falls within a range of 4,000 ppm to 2 percent based on the mass as the oxide. For water, the incorporation of more than 200 ppm is desirable, and the incorporation of equal to or more than 220 ppm is preferred, based on weight as converted to $H_2O$.

When employing $Yb_2O_3$ and $Nb_2O_5$ as glass components, and when adding Ce oxide as a clarifying agent, infrared absorption by these components can be used to enhance substrate heating efficiency.

The method of manufacturing the glass substrate will be described below.

First, to achieve the desired glass composition, glass starting materials such as oxides, carbonates, nitrates, sulfates, and hydroxides are weighed out and dispersed; thoroughly stirring the mixture; heating and melting the mixture within a range of 1,400 to 1,600° C., for example, in a melting vessel; clarifying and stirring the melt to adequately remove bubbles to form the homogenized glass melt. Clarifying agents can be added to the glass starting materials other than the other components, as needed. Sn oxide and Ce oxide are desirably employed as clarifying agents because of the following reasons.

Sn oxide releases oxygen gas at high temperature during melting of the glass, takes in minute bubbles contained in the glass and converts them to large bubbles so that they tend to rise, thereby functioning well to promote clarification. Additionally, Ce oxide incorporates as a glass component oxygen that is present as a gas in the glass at low temperature, thereby functioning well to eliminate bubbles. When the size of the bubbles (the size of the bubbles (voids) remaining in the glass upon solidification) falls within the range of equal to or lower than 0.3 mm, the action of Sn oxide in eliminating both relatively large and extremely small bubbles is strong. When Ce oxide is added with Sn oxide, the density of bubbles from about 50 µm to 0.3 mm in size is greatly reduced to about one part in several tens of parts. Causing both Sn oxide and Ce oxide to be present together in this manner can increase the clarifying effect on the glass over a wide temperature range running from the high temperature region to the low temperature region. Thus, it is desirable to add Sn oxide and Ce oxide.

When the total quantity of Sn oxide and Ce oxide that is added relative to the total of the other components is equal to or greater than 0.02 mass percent, an adequate clarifying effect can be anticipated. When a substrate is prepared using glass containing even trace or small quantities of unmelted material, and the unmelted material appears on the surface of the glass substrate due to polishing, protrusions are generated on the glass substrate surface and portions where the unreacted material drops out become pits. The smoothness of the glass substrate surface is lost, and the substrate cannot be used for a magnetic recording medium. By contrast, when the total quantity of Sn oxide and Ce oxide added relative to the total of the other components is equal to or less than 3.5 mass percent, they can dissolve adequately into the glass and prevent the incorporation of unmelted material.

When preparing crystallized glass, Sn and Ce function to produce crystal nuclei. Since the glass substrate of the present invention is comprised of amorphous glass, it is desirable not to cause crystals to precipitate by heating. When the quantities of Sn and Ce are excessive, such precipitation of crystals tends to occur. Thus, the addition of an excessive quantity of Sn oxide or Ce oxide is to be avoided.

From the above perspectives, the total quantity of Sn oxide and Ce oxide added relative to the total of the other components is desirably 0.02 to 3.5 mass percent. The total quantity of Sn oxide and Ce oxide added relative to the total of the other components preferably falls within a range of 0.1 to 2.5 mass percent, more preferably a range of 0.1 to 1.5 mass percent, and still more preferably, within a range of 0.5 to 1.5 mass percent.

The use of $SnO_2$ as the Sn oxide is desirable to effectively release oxygen gas from the glass melt at high temperature.

Sulfates can also be added as clarifying agents in a range of 0 to 1 mass percent relative to the total of the other components. However, there is a risk of melted material in the glass melt being blown off. In that case, foreign material increases markedly in the glass. Therefore, when such blowing off is concerned, it is desirable not to incorporate sulfates. Other than the above clarifying agents, components that have a clarifying effect without diminishing the object of the present invention can be employed. However, it is better not to add As having large environmental load, as described above. In addition, Sb is also desirably not employed from the perspective of environmental load.

Next, the glass molded product in the form of substrate can be obtained by molding the glass melt prepared with a method of press molding, down draw, or floating into a plate shape; and employing a step of processing the plate-shaped glass obtained.

In the press molding method, an outflowing glass melt is cut to obtain a desired glass melt gob. The glass gob is then press molded with a pressing mold to prepare a thin disk-shaped substrate blank.

In the down draw method, a gutter-shaped molded member is employed to guide the glass melt, the glass melt is caused to overflow to the two sides of the molded member, two streams of glass melt flowing downward along the molded member are caused to flow together beneath the molded member and then drawn downward and molded into a sheet form. This method is also referred to as the fusion method. The surfaces of the glass that has contacted the molded member are laminated together to obtain sheet glass without contact traces. Subsequently, thin disk-shaped substrate blanks are cut out of the sheet material obtained.

In the floating method, a glass melt is caused to flow out onto a float bath of accumulated molten tin or the like, and molded into sheet glass while being drawn. Subsequently, thin disk-shaped substrate blanks are cut out of the sheet material obtained.

A center hole is provided in the substrate blank thus obtained, the inner and outer circumferences thereof are processed, and the two main surfaces thereof are lapped and polished. Next, a cleaning step comprising acid cleaning and alkali cleaning is conducted to obtain a disk-shaped substrate.

In the present invention, the term "main surface" means the surface of a substrate on which a magnetic recording layer is to be provided or has been provided. Since such surfaces are those with the largest area among the surfaces of the substrate of a magnetic recording medium, they are called main surfaces. In the case of a disk-shaped magnetic recording medium, they correspond to the surface of the circular shape of the disk (excluding the center hole when present).

Since the glass substrate of the present invention is imparted with a good chemical strengthening property by the above adjustment of the composition, an ion-exchange layer can be readily formed on the surface by means of a chemical strengthening treatment. That is, an ion-exchange layer can be present over a part or all of the surface of the glass substrate of the present invention. The ion-exchange layer can be formed by bringing an alkali salt into contact with the surface of the substrate at high temperature to exchange the alkali metal ions in the alkali salt with alkali metal ions in the substrate. In a common ion exchange, an alkali nitrate is heated to obtain molten salt, and the substrate is immersed in the molten salt. By replacing alkali metal ions of small ionic radius in the substrate with alkali metal ions of large ionic radius, a compressive stress layer is formed in the substrate surface. This can enhance the fracture durability of the substrate and improves reliability. For example, immersion of the glass substrate in molten salt in the form of potassium nitrate causes the Li ions and Na ions in the substrate to be replaced with K ions in the molten salt, forming an ion-exchange layer on the surface of the substrate. The ion exchange can also reduce the quantity of alkali eluting out of the substrate surface. In chemical strengthening, the ion exchange is desirably conducted at a temperature that is higher than the distortion point of the glass constituting the substrate but lower than the glass transition temperature within a temperature range at which the molten alkali salt does not thermally decompose. The presence of an ion-exchange layer on the substrate can be confirmed by observing the cross-section of the glass (along a plane passing through the ion-exchange layer) by the Babinet's method, the method of measuring the concentration distribution of the alkali metal ions from the glass surface in the direction of depth, or the like.

Since the glass substrate of the present invention contains $Li_2O$ as an essential component as set forth above, the ion exchange desirably consists of an exchange of one or more alkali metal ion selected from the group consisting of Na, K, Rb, and Cs, which have greater ionic radii than Li.

Deflecting strength is commonly employed as an index of the impact resistance of the glass substrate for a magnetic recording medium. As shown in FIG. 1, the deflecting strength can be determined by placing a steel ball in the center hole of a glass substrate positioned on a holder, applying a load with a load cell, and taking the load value when the glass substrate is broken down. The measurement can be conducted with a deflecting strength measuring and testing device (Shimadzu Autograph DDS-2000), for example. It is desirable for the glass substrate of the present invention to have a deflecting strength of, for example, equal to or greater than 10 kg, desirably equal to or greater than 15 kg, and preferably, equal to or greater than 20 kg. The deflecting strength within the above range can be achieved by conducting the above composition adjustment, and optionally by conducting the chemical strengthening treatment.

The glass substrate of the present invention is, for example, equal to or less than 1.5 mm in thickness, desirably equal to or less than 1.2 mm in thickness, and preferably, equal to or less than 1 mm in thickness. The lower limit is desirably 0.3 mm. The main surface on which a magnetic recording layer is formed desirably has surface properties (1) to (3) below (1) an arithmetic average surface roughness Ra measured over an area of 1 μm×1 μm by an atomic force microscope of equal to or lower than 0.25 nm;

(2) an arithmetic average surface roughness Ra measured over an area of 5 μm×5 μm of equal to or lower than 0.15 nm;

(3) an arithmetic average surface waviness Wa at a wavelength of 100 μm to 950 μm of equal to or lower than 0.5 nm.

The grain size of the magnetic recording layer that is formed on the substrate is, for example, less than 10 nm in a vertical recording method. To increase the recording density, even when a minute bit size is employed, no improvement in magnetic characteristics can be anticipated when the surface roughness of the substrate is high. By contrast, a substrate in which the arithmetic averages Ra of the two types of surface roughens of (1) and (2) above fall within the above-stated ranges permits improvement in magnetic characteristics even when a minute bit size is employed to achieve a high recording density. Keeping the arithmetic average of surface waviness Wa of (3) above within the stated range permits enhancement of the floating stability of the magnetic head in an HDD. The acid resistance and alkali resistance of the glass are effective for achieving a substrate having surface properties (1) to (3) described above.

The magnetic recording medium of the present invention can be called a magnetic disk, hard disk, or the like. It is suited to use in an internal memory device (fixed disk or the like) such as a desktop computer, server-use computer, laptop computer, or mobile computer; internal memory device such as a portable recording and reproduction device that records and reproduces images and/or sound; vehicle-mounted audio recording and reproduction devices; and the like. As described above, it is particularly suited to the heat-assisted recording method.

Examples

The present invention is described in greater detail below through Examples. However, the present invention is not limited to the embodiments shown in Examples.

(1) Preparation of Glass Melts

Starting materials such as oxides, carbonates, nitrates, and hydroxides were weighed out and mixed to obtain blended starting materials in a manner calculated to yield glasses of the compositions shown in Table 1. Each of the starting materials was charged to a melting vessel and heated, melted, clarified, and stirred for 3 to 6 hours within a range of 1,400 to 1,600° C. to prepare a homogenous glass melt containing no bubbles or unmelted matter. No bubbles, unmelted material, crystal precipitation, or contaminants in the form of flame-resistant material or platinum constituting the melting vessel were found in the glasses obtained.

(2) Preparation of Substrate Blanks

Next, disk-shaped substrate blanks were prepared by methods A and B below.

(Method A)

The above glass melt that had been clarified and homogenized was caused to flow out of a pipe at a constant flow rate and received in the lower mold of a pressing mold. The outflowing glass melt was cut with a cutting blade to obtain a glass melt gob of prescribed weight on the lower mold. The lower mold carrying the glass melt gob was then immediately removed from beneath the pipe. Using an upper mold facing the lower mold and a sleeve mold, the glass melt was press molded into a thin disk shape measuring 66 mm in diameter and 2 mm in thickness. The press-molded article was cooled to a temperature at which it would not deform, removed from the mold, and annealed, yielding a substrate blank. In the molding, multiple lower molds were used and the outflowing glass melt was continuously molded into disk-shaped substrate blanks.

(Method B)

The glass melt that had been clarified and homogenized was continuously cast from above into the through-holes of a heat-resistant casting mold provided with round through-holes, molded into round rods, and brought out from beneath the through holes. The glass that was brought out was annealed. The glass was then sliced at constant intervals in a direction perpendicular to the axis of the round rods using a multiwire saw to prepare disk-shaped substrate blanks.

Methods A and B were employed in the present Examples. However, methods C and D, described below, are also suitable as methods for manufacturing disk-shaped substrate blanks.

(Method C)

The above glass melt is caused to flow out onto a float bath, molded into sheet glass (molded by the floating method), and then annealed. Disk-shaped pieces of glass can be then cut from the sheet glass to obtain substrate blanks.

(Method D)

The above glass melt is molded into sheet glass by the overflow down draw method (fusion method) and annealed. Disk-shaped pieces of glass can be then cut from the sheet glass to obtain substrate blanks.

(3) Preparation of Glass Substrates

Through-holes were formed in the center of substrate blanks obtained by the various above methods. The inner and outer circumferences thereof were ground and the main surfaces of the disks were lapped and polished (polished to mirror surfaces) to finish them into magnetic disk-use glass substrates 65 mm in diameter and 0.7 mm in thickness. The glass substrates obtained were cleaned with a 1.7 mass percent hydrofluosilicic acid (H$_2$SiF) aqueous solution and a 1 mass percent potassium hydroxide aqueous solution. They were then rinsed with pure water and dried. The surfaces of the substrates prepared from the glass of Examples were observed under magnification, revealing no surface roughness. The surfaces were smooth.

In (4) below, disk-shaped glass substrates prepared by the above-described method were used without any change to prepare magnetic disks. Separately, disk-shaped glass substrates prepared by the same method as above were immersed in a mixed molten salt of sodium nitrate and potassium nitrate to obtain glass substrates having an ion-exchange layer produced by ion exchange on the surfaces thereof. Such ion-exchange processing is effective to increase the deflecting strength. The cross-sections (planes passing through the ion-exchange layer) of glass substrates sampled from multiple glass substrate subjected to ion-exchange processing were observed by the Babinet's method, revealing the formation of ion-exchange layers. Measurement by the above-described method of the deflecting strength of various glass substrates following ion-exchange processing revealed a value of equal to or greater than 20 kg. Disk-shaped glass substrates that have been ion-exchange processed in this manner can also be employed to prepare magnetic disks.

In the above example, the substrates were immersed in a mixed molten salt of sodium nitrate and potassium nitrate to prepare glass substrates having ion-exchange layers. Instead of a mixed molten salt of sodium nitrate and potassium nitrate, ion-exchange layers can also be formed by conducting ion-exchange processing by immersing the glass substrate in any one of:
(A) a mixed molten salt of a potassium compound and a rubidium compound;
(B) a mixed molten salt of a potassium compound and a cesium compound;
(C) a mixed molten salt of a rubidium compound and a cesium compound;
(D) a mixed molten salt of a potassium compound, rubidium compound, and cesium compound;
(E) the molten salt of a rubidium compound; or
(F) the molten salt of a cesium compound.

Nitrates can be employed, for example, as the molten salt. The ion-exchange layer can be formed over the entire region of the glass substrate surface, formed over just the outer circumferential surface thereof, or formed over just the outer circumferential surface and inner circumferential surface thereof.

(4) Formation of Magnetic Disks

The following method was used to sequentially form an adhesive layer, undercoat layer, magnetic layer, protective layer, and lubricating layer on the main surface of each of the glass substrates obtained from the glasses of Examples, yielding magnetic disks.

First, a film-forming device in which a vacuum had been drawn was employed to sequentially form the adhesive layer, undercoat layer, and magnetic layer in an Ar atmosphere by the DC magnetron sputtering method.

At the time, the adhesive layer was formed as an amorphous CrTi layer 20 nm in thickness using a CrTi target. Next, a single-substrate, static opposed type film-forming device was employed to form a layer 10 nm in thickness comprised of amorphous CrRu as an undercoat layer by the DC magnetron sputtering method in an Ar atmosphere. Further, the magnetic layer was formed at a film forming temperature of 400° C. using an FePt or CoPt target to obtain an amorphous FePt or CoPt layer 200 nm in thickness.

The magnetic disks on which magnetic layers had been formed were moved from the film-forming device into a heating furnace and annealed at a temperature of 650 to 700° C.

Next, a protective layer comprised of hydrogenated carbon was formed by CVD method using ethylene as the material gas. Subsequently, PFPE (perfluoropolyether) was used to form a lubricating layer by the dip coating method. The lubricating layer was 1 nm in thickness.

The above manufacturing process yielded magnetic disks.

1. Evaluation of Glass
(1) Glass Transition Temperature Tg, Coefficient of Thermal Expansion The glass transition temperature Tg and average coefficient of linear expansion a at 100 to 300° C. of each of the glasses were measured with a thermomechanical analyzer (Thermo plus TMA8310) made by RIGAKU.
(2) Young's Modulus The Young's modulus of each of the glasses was measured by the ultrasonic method.
(3) Specific Gravity The specific gravity of each of the glasses was measured by Archimedes' method.
(4) Specific Modulus of Elasticity The specific modulus of elasticity was calculated from the Young's modulus obtained in (2) above and the specific gravity obtained in (3) above.

2. Evaluation of Substrates (Surface Roughness, Surface Waviness)

A 5 μm×5 μm square region of the main surface of each of the substrates of Examples (surface on which the magnetic recording layer and the like were laminated) was observed by an atomic force microscope (AFM). The arithmetic average of the surface roughness Ra was measured for an area of 1 μm×1 μm and the arithmetic average of the surface roughness Ra was measured for an area of 5 μm×5 μm. The arithmetic average of the surface waviness Wa at a wavelength of 100 μm to 950 μm was also measured.

The arithmetic averages of the surface roughness Ra measured for an area of 1 μm×1 μm ranged from 0.15 to 0.25 nm for all of the glass substrates of Examples. The arithmetic averages of the surface roughness Ra measured for an area of 5 μm×5 μm ranged from 0.12 to 0.15 nm. And the arithmetic averages Wa of surface waviness at a wavelength of 100 μm to 950 μm were 0.4 to 0.5 nm. These ranges presented no problems for substrates employed in magnetic recording media.

TABLE 1

| Glass composition (Content: molar %, ratio: molar ratio) | 1 | 2 | 3 | 4 | 5 | 6 | 7 | 8 |
|---|---|---|---|---|---|---|---|---|
| SiO$_2$ | 64.00 | 63.00 | 64.00 | 64.00 | 60.00 | 64.00 | 65.00 | 65.00 |
| B$_2$O$_3$ | 0.00 | 0.00 | 0.00 | 0.00 | 0.00 | 0.00 | 0.00 | 0.00 |
| Al$_2$O$_3$ | 5.00 | 6.00 | 5.00 | 5.00 | 9.00 | 6.00 | 6.00 | 6.00 |
| Li$_2$O | 1.50 | 1.50 | 1.50 | 1.50 | 1.50 | 1.50 | 1.50 | 1.50 |
| Na$_2$O | 8.50 | 8.50 | 8.50 | 8.50 | 8.50 | 8.00 | 8.00 | 8.00 |
| K$_2$O | 0.00 | 0.00 | 0.00 | 0.00 | 0.00 | 0.00 | 0.00 | 0.00 |

TABLE 1-continued

| | | | | | | | | |
|---|---|---|---|---|---|---|---|---|
| MgO | 4.00 | 4.00 | 10.00 | 13.00 | 2.00 | 3.00 | 2.00 | 1.00 |
| CaO | 13.00 | 13.00 | 7.00 | 4.00 | 15.00 | 13.50 | 13.50 | 14.50 |
| SrO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $ZrO_2$ | 4.00 | 4.00 | 4.00 | 4.00 | 4.00 | 4.00 | 4.00 | 4.00 |
| TiO2 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $Yb_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $Ta_2O_5$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $Li_2O + Na_2O + K_2O$ | 10.00 | 10.00 | 10.00 | 10.00 | 10.00 | 9.50 | 9.50 | 9.50 |
| $Li_2O/Na_2O$ | 0.18 | 0.18 | 0.18 | 0.18 | 0.18 | 0.19 | 0.19 | 0.19 |
| $Li_2O/(Li_2O + Na_2O + K_2O)$ | 0.15 | 0.150 | 0.150 | 0.150 | 0.150 | 0.158 | 0.158 | 0.158 |
| $K_2O/Li_2O + Na_2O + K_2O)$ | 0.000 | 0.000 | 0.000 | 0.000 | 0.000 | 0.000 | 0.000 | 0.000 |
| $MgO + CaO + SrO$ | 17.00 | 17.00 | 17.00 | 17.00 | 17.00 | 16.50 | 15.50 | 15.50 |
| $MgO + CaO$ | 17.00 | 17.00 | 17.00 | 17.00 | 17.00 | 16.50 | 15.50 | 15.50 |
| $Li_2O + Na_2O + K_2O + MgO + CaO + SrO$ | 27.00 | 27.00 | 27.00 | 27.00 | 27.00 | 26.00 | 25.00 | 25.00 |
| $(MgO + CaO + Li_2O)/(Li_2O + Na_2O + K_2O + MgO + CaO + SrO)$ | 0.685 | 0.685 | 0.685 | 0.685 | 0.685 | 0.692 | 0.680 | 0.680 |
| $ZrO_2 + TiO_2 + Y_2O_3 + La_2O_3 + Gd_2O_3 + Nb_2O_5 + Ta_2O_5$ | 4.00 | 4.00 | 4.00 | 4.00 | 4.00 | 4.00 | 4.00 | 4.00 |
| $(SiO_2 + Al_2O_3 + ZrO_2 + TiO_2 + Y_2O_3 + La_2O_3 + Gd_2O_3 + Nb_2O_5 + Ta_2O_5)/(Li_2O + Na_2O + K_2O)$ | 7.30 | 7.30 | 7.30 | 7.30 | 7.30 | 7.79 | 7.89 | 7.89 |
| $(ZrO_2 + TiO_2 + Y_2O_3 + La_2O_3 + Gd_2O_3 + Nb_2O_5 + Ta_2O_5)/Al_2O_3$ | 0.800 | 0.667 | 0.800 | 0.800 | 0.444 | 0.667 | 0.667 | 0.667 |
| $(MgO + CaO)/(MgO + CaO + SrO)$ | 1.000 | 1.000 | 1.000 | 1.000 | 1.000 | 1.000 | 1.000 | 1.000 |
| Glass transition temperature Tg(° C.) | 633 | ≧630 | 639 | 650 | 658 | 646 | 646 | 651 |
| Average coefficient of linear expansion ($\times 10^{-7}$/° C.) (100~300° C.) | 77 | ≧75 | 72 | 70 | 74 | 75 | 74 | 74 |
| Young's modulus(GPa) | 87.5 | 87.8 | 87.9 | 88.3 | 88.8 | 87.6 | 86.7 | 86.8 |
| Specific modulus of elasticity(MNm/kg) | 32.8 | 32.9 | 33.3 | 33.5 | 33.0 | 32.8 | 32.6 | 32.6 |
| Specific gravity | 2.67 | 2.67 | 2.64 | 2.63 | 2.69 | 2.67 | 2.66 | 2.66 |

| Glass composition (Content: molar %, ratio: molar ratio) | 9 | 10 | 11 | 12 | 13 | 14 | 15 | 16 |
|---|---|---|---|---|---|---|---|---|
| $SiO_2$ | 65.00 | 65.00 | 65.00 | 64.00 | 64.00 | 64.00 | 63.00 | 65.00 |
| $B_2O_3$ | 0.00 | 0.00 | 0.00 | 0.00 | 0.00 | 0.00 | 0.00 | 0.00 |
| $Al_2O_3$ | 6.00 | 6.00 | 6.00 | 5.00 | 5.00 | 5.00 | 6.00 | 6.00 |
| $Li_2O$ | 1.50 | 1.50 | 1.50 | 1.50 | 1.50 | 1.50 | 1.00 | 2.00 |
| $Na_2O$ | 8.00 | 8.00 | 8.00 | 8.50 | 8.50 | 8.50 | 8.00 | 6.50 |
| $K_2O$ | 0.00 | 0.00 | 0.00 | 0.00 | 0.00 | 0.00 | 1.00 | 1.00 |
| MgO | 0.00 | 1.00 | 0.00 | 2.00 | 4.00 | 4.00 | 4.00 | 1.50 |
| CaO | 15.50 | 13.50 | 13.50 | 13.00 | 13.00 | 13.00 | 13.00 | 14.00 |
| SrO | 0.00 | 1.00 | 2.00 | 2.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 2.00 | 0.00 | 0.00 |
| $ZrO_2$ | 4.00 | 4.00 | 4.00 | 4.00 | 2.00 | 2.00 | 4.00 | 4.00 |
| TiO2 | 0.00 | 0.00 | 0.00 | 0.00 | 2.00 | 0.00 | 0.00 | 0.00 |
| $Y_2O_3$ | 0.00 | 0.00 | 0.00 | 0.00 | 0.00 | 0.00 | 0.00 | 0.00 |
| $Yb_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $Ta_2O_5$ | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 |
| $Li_2O + Na_2O + K_2O$ | 9.50 | 9.50 | 9.50 | 10.00 | 10.00 | 10.00 | 10.00 | 9.50 |
| $Li_2O/Na_2O$ | 0.19 | 0.19 | 0.19 | 0.18 | 0.18 | 0.18 | 0.13 | 0.31 |
| $Li_2O/(Li_2O + Na_2O + K_2O)$ | 0.158 | 0.158 | 0.158 | 0.150 | 0.150 | 0.150 | 0.100 | 0.211 |
| $K_2O/Li_2O + Na_2O + K_2O)$ | 0.000 | 0.000 | 0.000 | 0.000 | 0.000 | 0.000 | 0.100 | 0.105 |
| $MgO + CaO + SrO$ | 15.50 | 15.50 | 15.50 | 17.00 | 17.00 | 17.00 | 17.00 | 15.50 |
| $MgO + CaO$ | 15.50 | 14.50 | 13.50 | 15.00 | 17.00 | 17.00 | 17.00 | 15.50 |
| $Li_2O + Na_2O + K_2O + MgO + CaO + SrO$ | 25.00 | 25.00 | 25.00 | 27.00 | 27.00 | 27.00 | 27.00 | 25.00 |
| $(MgO + CaO + Li_2O)/(Li_2O + Na_2O + K_2O + MgO + CaO + SrO)$ | 0.680 | 0.640 | 0.600 | 0.611 | 0.685 | 0.685 | 0.667 | 0.700 |
| $ZrO_2 + TiO_2 + Y_2O_3 + La_2O_3 + Gd_2O_3 + Nb_2O_5 + Ta_2O_5$ | 4.00 | 4.00 | 4.00 | 4.00 | 4.00 | 2.00 | 4.00 | 4.00 |
| $(SiO_2 + Al_2O_3 + ZrO_2 + TiO_2 + Y_2O_3 + La_2O_3 + Gd_2O_3 + Nb_2O_5 + Ta_2O_5)/(Li_2O + Na_2O + K_2O)$ | 7.89 | 7.89 | 7.89 | 7.30 | 7.30 | 7.10 | 7.30 | 7.89 |
| $(ZrO_2 + TiO_2 + Y_2O_3 + La_2O_3 + Gd_2O_3 + Nb_2O_5 + Ta_2O_5)/Al_2O_3$ | 0.667 | 0.667 | 0.667 | 0.800 | 0.800 | 0.400 | 0.667 | 0.667 |
| $(MgO + CaO)/(MgO + CaO + SrO)$ | 1.000 | 0.935 | 0.871 | 0.882 | 1.000 | 1.000 | 1.000 | 1.000 |

TABLE 1-continued

| | | | | | | | | |
|---|---|---|---|---|---|---|---|---|
| Glass transition temperature Tg(° C.) | 656 | 645 | ≧620 | 620 | 620 | 605 | 650 | 640 |
| Average coefficient of linear expansion ($\times 10^{-7}$/° C.) (100~300° C.) | 75 | 74 | >70 | 79 | 80 | 75 | 81 | 77 |
| Young's modulus(GPa) | 86.4 | 87.0 | 86.7 | 87.5 | 86.3 | 85.6 | 87.5 | 87.5 |
| Specific modulus of elasticity(MNm/kg) | 32.4 | 32.4 | 32.1 | 32.3 | 32.8 | 32.3 | 32.8 | 33.0 |
| Specific gravity | 2.66 | 2.88 | 2.70 | 2.71 | 2.63 | 2.65 | 2.66 | 2.65 |

| Glass composition (Content: molar %, ratio: molar ratio) | 17 | 18 | 19 | 20 | 21 | 22 | 23 |
|---|---|---|---|---|---|---|---|
| $SiO_2$ | 67.00 | 65.00 | 65.00 | 64.00 | 64.00 | 63.00 | 64.00 |
| $B_2O_3$ | 0.00 | 0.00 | 0.00 | 0.00 | 0.00 | 0.00 | 0.00 |
| $Al_2O_3$ | 2.00 | 3.00 | 2.00 | 5.00 | 5.00 | 4.00 | 5.00 |
| $Li_2O$ | 0.50 | 1.00 | 1.00 | 3.00 | 1.50 | 1.00 | 1.50 |
| $Na_2O$ | 9.50 | 9.00 | 9.00 | 7.00 | 8.50 | 8.00 | 8.50 |
| $K_2O$ | 0.00 | 1.00 | 1.00 | 0.00 | 0.00 | 0.00 | 0.00 |
| MgO | 4.00 | 1.00 | 1.00 | 0.00 | 0.00 | 2.00 | 4.00 |
| CaO | 13.00 | 15.00 | 15.00 | 17.00 | 17.00 | 18.00 | 13.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| $ZrO_2$ | 4.00 | 5.00 | 6.00 | 4.00 | 4.00 | 4.00 | 2.00 |
| $TiO2$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $Yb_2O_3$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $Gd_2O_3$ | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 2.00 |
| $Ta_2O_5$ | 0.00 | 0.00 | 0.00 | 0.00 | 0.00 | 0.00 | 0.00 |
| Total | 100.00 | 100.00 | 100.00 | 100.00 | 100.00 | 100.00 | 100.00 |
| $Li_2O + Na_2O + K_2O$ | 10.00 | 11.00 | 11.00 | 10.00 | 10.00 | 9.00 | 10.00 |
| $Li_2O/Na_2O$ | 0.05 | 0.11 | 0.11 | 0.43 | 0.18 | 0.13 | 0.18 |
| $Li_2O/(Li_2O + Na_2O + K_2O)$ | 0.050 | 0.091 | 0.091 | 0.300 | 0.150 | 0.111 | 0.150 |
| $K_2O/Li_2O + Na_2O + K_2O)$ | 0.000 | 0.091 | 0.091 | 0.000 | 0.000 | 0.000 | 0.000 |
| $MgO + CaO + SrO$ | 17.00 | 16.00 | 16.00 | 17.00 | 17.00 | 20.00 | 17.00 |
| $MgO + CaO$ | 17.00 | 16.00 | 16.00 | 17.00 | 17.00 | 20.00 | 17.00 |
| $Li_2O + Na_2O + K_2O + MgO + CaO + SrO$ | 27.00 | 27.00 | 27.00 | 27.00 | 27.00 | 29.00 | 27.00 |
| $(MgO + CaO + Li_2O)/(Li_2O + Na_2O + K_2O + MgO + CaO + SrO)$ | 0.648 | 0.630 | 0.630 | 0.741 | 0.685 | 0.724 | 0.685 |
| $ZrO_2 + TiO_2 + Y_2O_3 + La_2O_3 + Gd_2O_3 + Nb_2O_5 + Ta_2O_5$ | 4.00 | 5.00 | 6.00 | 4.00 | 4.00 | 4.00 | 4.00 |
| $(SiO_2 + Al_2O_3 + ZrO_2 + TiO_2 + Y_2O_3 + La_2O_3 + Gd_2O_3 + Nb_2O_5 + Ta_2O_5)/(Li_2O + Na_2O + K_2O)$ | 7.30 | 6.64 | 6.64 | 7.30 | 7.30 | 7.89 | 7.30 |
| $(ZrO_2 + TiO_2 + Y_2O_3 + La_2O_3 + Gd_2O_3 + Nb_2O_5 + Ta_2O_5)/Al_2O_3$ | 2.000 | 1.667 | 3.000 | 0.800 | 0.800 | 1.000 | 0.800 |
| $(MgO + CaO)/(MgO + CaO + SrO)$ | 1.000 | 1.000 | 1.000 | 1.000 | 1.000 | 1.000 | 1.000 |
| Glass transition temperature Tg(° C.) | 630 | 636 | 640 | 622 | 645 | 646 | 632 |
| Average coefficient of linear expansion ($\times 10^{-7}$/° C.) (100~300° C.) | 79 | 83 | 83 | 80 | 85 | 77 | 78 |
| Young's modulus(GPa) | 85.0 | 86.6 | 87.8 | 89.0 | 87.3 | 88.5 | 87.4 |
| Specific modulus of elasticity(MNm/kg) | 32.0 | 32.1 | 32.2 | 33.2 | 32.5 | 32.7 | 32.2 |
| Specific gravity | 2.66 | 2.70 | 2.73 | 2.68 | 2.68 | 2.71 | 2.71 |

| Glass composition (Content: molar %, ratio: molar ratio) | 24 | 25 | 26 | 27 | 28 | 29 | 30 | 31 | 32 |
|---|---|---|---|---|---|---|---|---|---|
| $SiO_2$ | 64.00 | 64.00 | 64.00 | 64.00 | 64.00 | 62.00 | 64.00 | 64.00 | 64.00 |
| $B_2O_3$ | 0.00 | 0.00 | 0.00 | 0.00 | 0.00 | 0.00 | 0.00 | 0.00 | 0.00 |
| $Al_2O_3$ | 5.00 | 5.00 | 5.00 | 5.00 | 5.00 | 5.00 | 5.00 | 5.00 | 5.00 |
| $Li_2O$ | 1.50 | 1.50 | 1.50 | 1.50 | 1.50 | 0.50 | 0.50 | 2.50 | 1.00 |
| $Na_2O$ | 8.50 | 8.50 | 8.50 | 8.50 | 8.50 | 12.50 | 11.00 | 8.00 | 12.50 |
| $K_2O$ | 0.00 | 0.00 | 0.00 | 0.00 | 0.00 | 2.00 | 1.50 | 0.00 | 0.00 |
| MgO | 4.00 | 4.00 | 4.00 | 4.00 | 4.00 | 0.00 | 1.50 | 2.00 | 1.50 |
| CaO | 13.00 | 13.00 | 13.00 | 13.00 | 13.00 | 14.00 | 12.00 | 14.50 | 12.00 |
| SrO | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 |
| $ZrO_2$ | 2.00 | 2.00 | 2.00 | 2.00 | 2.00 | 4.00 | 4.50 | 4.00 | 4.00 |
| $TiO2$ | 0.00 | 0.00 | 0.00 | 0.00 | 0.00 | 0.00 | 0.00 | 0.00 | 0.00 |
| $Y_2O_3$ | 2.00 | 0.00 | 0.00 | 0.00 | 0.00 | 0.00 | 0.00 | 0.00 | 0.00 |
| $Yb_2O_3$ | 0.00 | 0.00 | 0.00 | 2.00 | 0.00 | 0.00 | 0.00 | 0.00 | 0.00 |
| $La_2O_3$ | 0.00 | 2.00 | 0.00 | 0.00 | 0.00 | 0.00 | 0.00 | 0.00 | 0.00 |
| $Gd_2O_3$ | 0.00 | 0.00 | 2.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 | 0.00 |
| $Ta_2O_5$ | 0.00 | 0.00 | 0.00 | 0.00 | 2.00 | 0.00 | 0.00 | 0.00 | 0.00 |
| Total | 100.00 | 100.00 | 100.00 | 100.00 | 100.00 | 100.00 | 100.00 | 100.00 | 100.00 |
| $Li_2O + Na_2O + K_2O$ | 10.00 | 10.00 | 10.00 | 10.00 | 10.00 | 15.00 | 13.00 | 10.50 | 13.50 |

TABLE 1-continued

| | | | | | | | | | |
|---|---|---|---|---|---|---|---|---|---|
| $Li_2O/Na_2O$ | 0.18 | 0.18 | 0.18 | 0.18 | 0.18 | 0.04 | 0.05 | 0.31 | 0.08 |
| $Li_2O/(Li_2O + Na_2O + K_2O)$ | 0.150 | 0.150 | 0.150 | 0.150 | 0.150 | 0.033 | 0.038 | 0.238 | 0.074 |
| $K_2O/Li_2O + Na_2O + K_2O)$ | 0.000 | 0.000 | 0.000 | 0.000 | 0.000 | 0.133 | 0.115 | 0.000 | 0.000 |
| $MgO + CaO + SrO$ | 17.00 | 17.00 | 17.00 | 17.00 | 17.00 | 14.00 | 13.50 | 16.50 | 13.50 |
| $MgO + CaO$ | 17.00 | 17.00 | 17.00 | 17.00 | 17.00 | 14.00 | 13.50 | 16.50 | 13.50 |
| $Li_2O + Na_2O + K_2O + MgO + CaO + SrO$ | 27.00 | 27.00 | 27.00 | 27.00 | 27.00 | 29.00 | 26.50 | 27.00 | 27.00 |
| $(MgO + CaO + Li_2O)/(Li_2O + Na_2O + K_2O + MgO + CaO + SrO)$ | 0.685 | 0.685 | 0.685 | 0.685 | 0.685 | 0.500 | 0.528 | 0.704 | 0.537 |
| $ZrO_2 + TiO_2 + Y_2O_3 + La_2O_3 + Gd_2O_3 + Nb_2O_5 + Ta_2O_5$ | 4.00 | 4.00 | 4.00 | 4.00 | 4.00 | 4.00 | 4.50 | 4.00 | 4.00 |
| $(SiO_2 + Al_2O_3 + ZrO_2 + TiO_2 + Y_2O_3 + La_2O_3 + Gd_2O_3 + Nb_2O_5 + Ta_2O_5)/(Li_2O + Na_2O + K_2O)$ | 7.30 | 7.30 | 7.30 | 7.30 | 7.30 | 4.73 | 5.65 | 6.95 | 5.41 |
| $(ZrO_2 + TiO_2 + Y_2O_3 + La_2O_3 + Gd_2O_3 + Nb_2O_5 + Ta_2O_5)/Al_2O_3$ | 0.800 | 0.800 | 0.800 | 0.800 | 0.800 | 0.800 | 0.900 | 0.800 | 0.800 |
| $(MgO + CaO)/(MgO + CaO + SrO)$ | 1.000 | 1.000 | 1.000 | 1.000 | 1.000 | 1.000 | 1.000 | 1.000 | 1.000 |
| Glass transition temperature Tg(° C.) | 639 | 623 | 625 | 641 | 642 | 616 | 623 | 617 | >600 |
| Average coefficient of linear expansion ($\times 10^{-7}$/° C.) (100~300° C.) | 76 | 80 | 81 | 77 | 74 | 98 | 89 | 79 | >75 |
| Young's modulus(GPa) | 88.9 | 87.7 | 88.4 | 89.0 | 89.2 | 83.1 | 84.0 | 88.4 | 84.4 |
| Specific modulus of elasticity(MNm/kg) | 32.6 | 31.3 | 31.1 | 31.0 | 31.2 | 31.1 | 31.5 | 33.1 | 31.8 |
| Specific gravity | 2.73 | 2.80 | 2.84 | 2.87 | 2.86 | 2.67 | 2.66 | 2.67 | 2.65 |

As indicated in Table 1, the glasses of Examples had the three characteristics required of a magnetic recording medium substrate, namely, high heat resistance (high glass transition temperatures), high rigidity (high Young's moduli), and high coefficients of thermal expansion. From the results of Table 1, it can be confirmed that the glasses of Examples had high specific moduli of elasticity enabling them to withstand high-speed rotation, and low specific gravities, permitting substrate weight reduction. Additionally, the glasses of Examples were found to permit the ready formation of ion-exchange layers by a chemical strengthening treatment.

Based on the above results, the present invention was determined to yield glasses having the characteristics required of the magnetic recording medium substrate.

3. Evaluation of Magnetic Disks (1) Flatness

Generally, a degree of flatness of equal to or lower than 5 μm permits highly reliable recording and reproduction. The degree of flatness (the distance (difference in height) in the vertical direction (direction perpendicular to the surface) of the highest portion and lowest portion of the disk surfaces) of the surfaces of the various magnetic disks formed using the glass substrates of Examples by the above-described methods was measured with a flatness measuring device. All of the magnetic disks had degrees of flatness of equal to or lower than 5 μm. From these results, it can be determined that the glass substrates of Examples did not undergo substantial deformation even when processed at high temperature during the formation of an FePt layer or CoPt layer.

(2) Load/Unload Test

The various magnetic disks formed using the glass substrates of Examples by the above methods were loaded into a 2.5-inch hard disk drive that rotated at a high speed of 5,400 rpm and subjected to a load/unload test ("LUL" hereinafter). The spindle of the spindle motor in the above hard disk drive was made of stainless steel. The durability of all of the magnetic disks exceeded 600,000 cycles. Further, although crash failures and thermal asperity failures will occur during LUL testing with deformation due to a difference in the coefficient of thermal expansion with the spindle material and deflection due to high-speed rotation, such failures did not occur during testing of any of the magnetic disks.

From these results, the present invention was determined to permit highly reliable recording and reproduction.

Magnetic disks prepared using the glass substrates of Examples by the above methods were loaded into the hard disk drive of a recording method in which the reversal of magnetization was assisted by irradiation with a laser beam (heat-assisted recording method) to prepare the information-recording device of a heat-assisted recording method. Separately, the magnetic disks that had been prepared were loaded into the hard disk drive of a recording method in which recording was assisted with microwaves (microwave-assisted recording method) to prepare the information-recording device of a microwave-assisted recording method. These information-recording devices, which combined magnetic materials of high Ku with energy-assisted recording, were capable of achieving high-density recording, as set forth above.

The present invention can provide an optimal magnetic recording medium for higher density recording.

What is claimed is:

1. A glass substrate for a magnetic recording medium, which is comprised of glass comprising, denoted as molar percentages, 56 to 75 percent of $SiO_2$, 1 to 11 percent of $Al_2O_3$, more than 0 percent but equal to or less than 4 percent of $Li_2O$, equal to or more than 1 percent but less than 15 percent of $Na_2O$, equal to or more than 0 percent but equal to or less than 1 percent of $K_2O$, and substantially no BaO, with a total content of alkali metal oxides selected from the group consisting of $Li_2O$, $Na_2O$, and $K_2O$ falling within a range of 6 to 15 percent, with a molar ratio ($Li_2O/Na_2O$) of a content of $Li_2O$ to a content of $Na_2O$ being less than 0.50, with a molar ratio $\{K_2O/(Li_2O+Na_2O+K_2O)\}$ of a content of $K_2O$ to a total content of the above alkali metal oxides being equal to or less than 0.13, with a total content of alkaline earth metal oxides selected from the group consisting of MgO, CaO, and SrO falling within a range of 10 to 30 percent, with a total content of MgO and CaO falling within a range of 10 to 30 percent, with a molar ratio {(MgO+CaO)/(MgO+CaO+SrO)} of a total content of MgO and CaO to a total content of the above alkaline earth metal oxides being equal to or more than 0.86, with a total content of the above alkali metal oxides and alkaline earth metal oxides falling within a range of 20 to 40 percent, with a molar ratio {(MgO+CaO+Li$_2$O)/(Li$_2$O+Na$_2$O+K$_2$O+MgO+CaO+SrO)} of a total content of MgO, CaO, and Li$_2$O to a total content of the above alkali metal oxides and alkaline earth metal oxides being equal to or more than 0.50, with a total content of oxides selected from the group consisting of ZrO$_2$, TiO$_2$, Y$_2$O$_3$, La$_2$O$_3$, Gd$_2$O$_3$, Nb$_2$O$_5$, and Ta$_2$O$_5$ being more than 0 percent but equal to or less than 10 percent, and with a molar ratio {(ZrO$_2$+TiO$_2$+Y$_2$O$_3$+La$_2$O$_3$+Gd$_2$O$_3$+Nb$_2$O$_5$+Ta$_2$O$_5$)/Al$_2$O$_3$} of a total content of the above oxides to a content of Al$_2$O$_3$ content being equal to or more than 0.40, as well as the glass having a glass transition temperature of equal to or higher than 600° C., an average coefficient of linear expansion of equal to or higher than 70×10$^{-7}$/° C. at 100 to 300° C., and a Young's modulus of equal to or higher than 80 GPa.

2. The glass substrate for a magnetic recording medium according to claim 1, which is employed, in a magnetic recording medium having a magnetic recording layer comprising either Fe and Pt or Co and Pt on a substrate, as the substrate.

3. The glass substrate for a magnetic recording medium according to claim 1, which is employed as a substrate of a magnetic recording medium for energy-assisted recording.

4. The glass substrate for a magnetic recording medium according to claim 3, which is employed as a substrate of a magnetic recording medium for heat-assisted recording.

5. The glass substrate for a magnetic recording medium according to claim 1, which comprises an ion-exchange layer over a part or all of the surface thereof.

6. The glass substrate for a magnetic recording medium according to claim 5, wherein the ion-exchange layer has been formed by ion exchanging with at least one alkali metal ion selected from the group consisting of Na, K, Rb, and Cs.

7. The glass substrate for a magnetic recording medium according to claim 1, which has a specific modulus of elasticity of equal to or greater than 30.0 MNm/kg.

8. The glass substrate for a magnetic recording medium according to claim 1, which has a specific gravity of equal to or less than 2.90.

9. A magnetic recording medium, which comprises a magnetic recording layer on the glass substrate according to claim 1.

10. The magnetic recording medium according to claim 9, wherein the magnetic recording layer comprises either Fe and Pt or Co and Pt.

11. The magnetic recording medium according to claim 9, which is a magnetic recording medium for energy-assisted recording.

12. The magnetic recording medium according to claim 11, which is a magnetic recording medium for heat-assisted recording.

13. The magnetic recording medium according to claim 9, wherein the glass substrate comprises an ion-exchange layer over a part or all of the surface thereof.

14. The magnetic recording medium according to claim 13, wherein the ion-exchange layer has been formed by ion exchanging with at least one alkali metal ion selected from the group consisting of Na, K, Rb, and Cs.

* * * * *